US011262851B2

(12) United States Patent
Cipoletta et al.

(10) Patent No.: US 11,262,851 B2
(45) Date of Patent: *Mar. 1, 2022

(54) TARGET SELECTION BASED ON HUMAN GESTURES

(71) Applicant: Pison Technology, Inc., Boston, MA (US)

(72) Inventors: David O. Cipoletta, Boston, MA (US); Dexter W. Ang, Boston, MA (US)

(73) Assignee: Pison Technology, Inc., Boston, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/384,527

(22) Filed: Jul. 23, 2021

(65) Prior Publication Data

US 2021/0349542 A1    Nov. 11, 2021

Related U.S. Application Data

(63) Continuation of application No. 16/890,507, filed on Jun. 2, 2020, now Pat. No. 11,157,086, which is a continuation-in-part of application No. 16/774,825, filed on Jan. 28, 2020, now abandoned.

(51) Int. Cl.
| | |
|---|---|
| *G06F 3/01* | (2006.01) |
| *H04W 4/029* | (2018.01) |
| *G06F 1/16* | (2006.01) |
| *H04W 4/021* | (2018.01) |
| *H04W 4/02* | (2018.01) |

(52) U.S. Cl.
CPC .............. *G06F 3/017* (2013.01); *G06F 1/163* (2013.01); *G06F 3/013* (2013.01); *H04W 4/021* (2013.01); *H04W 4/026* (2013.01); *H04W 4/027* (2013.01); *H04W 4/029* (2018.02)

(58) Field of Classification Search
CPC .......... G06F 3/017; G06F 1/163; G06F 3/013; H04W 4/029; H04W 4/021; H04W 4/026; H04W 4/027
See application file for complete search history.

(56) References Cited

U.S. PATENT DOCUMENTS

| | | | | |
|---|---|---|---|---|
| 8,228,315 | B1 * | 7/2012 | Starner | G06F 3/0304 |
| | | | | 345/175 |
| 11,157,086 | B2 * | 10/2021 | Cipoletta | G06F 3/013 |
| 2011/0166777 | A1 * | 7/2011 | Chavakula | G06F 3/04883 |
| | | | | 701/533 |
| 2013/0232148 | A1 * | 9/2013 | MacDonald | G06F 16/954 |
| | | | | 707/740 |

(Continued)

*Primary Examiner* — Hussein Elchanti
(74) *Attorney, Agent, or Firm* — Rothwell, Figg, Ernst & Manbeck, P.C.

(57) ABSTRACT

Systems and methods for selecting a target are provided. In some embodiments, a system may include a wearable device having one or more sensors. The sensors may be configured to detect physiological data and wrist location data. In some embodiments, the system may be configured to determine: (i) a vector intended by a user based on at least the wrist location data, and (ii) a gesture indicating an intention to make a selection based on at least the physiological data. The system may be configured to select a target indicated by the directional vector as determined when the gesture indicating the intention to make a selection is detected.

30 Claims, 15 Drawing Sheets

(56) References Cited

U.S. PATENT DOCUMENTS

| | | | | |
|---|---|---|---|---|
| 2015/0062086 A1* | 3/2015 | Nattukallingal | ........ | G06F 3/016 345/175 |
| 2015/0309582 A1* | 10/2015 | Gupta | .................... | G06F 3/017 345/156 |
| 2015/0323998 A1* | 11/2015 | Kudekar | ................ | G06F 3/014 345/156 |
| 2015/0332424 A1* | 11/2015 | Kane | .................... | G06F 21/556 705/325 |
| 2016/0026321 A1* | 1/2016 | Yeo | ........................ | G06F 3/017 345/173 |
| 2016/0034032 A1* | 2/2016 | Jeong | ................ | G02B 27/0179 345/156 |
| 2016/0307447 A1* | 10/2016 | Johnson | .................. | B60L 58/12 |
| 2017/0060518 A1* | 3/2017 | Hong | ................... | G06F 3/1423 |
| 2017/0064219 A1* | 3/2017 | Lin | ...................... | H04N 5/2354 |
| 2017/0164291 A1* | 6/2017 | Ludwig | ............ | H04W 52/0245 |
| 2017/0177086 A1* | 6/2017 | Yuen | ...................... | G06F 3/017 |
| 2017/0192665 A1* | 7/2017 | Karmon | ............ | G06K 9/00355 |
| 2017/0357329 A1* | 12/2017 | Park | ........................ | G06F 1/325 |
| 2018/0052492 A1* | 2/2018 | Okvist | .................. | G06F 1/1694 |
| 2018/0074520 A1* | 3/2018 | Liu | ...................... | G08G 5/0052 |
| 2018/0096609 A1* | 4/2018 | de la Cruz | ........... | G08G 5/0043 |
| 2018/0308187 A1* | 10/2018 | Rotem | .................. | G06T 19/003 |
| 2018/0329209 A1* | 11/2018 | Nattukallingal | ......... | G06F 3/011 |
| 2019/0101991 A1* | 4/2019 | Brennan | .................. | G06K 9/03 |
| 2019/0196600 A1* | 6/2019 | Rothberg | ................ | G06N 3/08 |
| 2019/0220099 A1* | 7/2019 | Baranski | ................ | A61B 5/389 |
| 2019/0243357 A1* | 8/2019 | Qiu | .................... | H04N 5/23299 |
| 2019/0265802 A1* | 8/2019 | Parshionikar | ............ | G06F 3/012 |
| 2020/0081560 A1* | 3/2020 | Geller | ................ | G06F 3/03545 |
| 2021/0149483 A1* | 5/2021 | Berardi | .................. | G06F 3/167 |

\* cited by examiner

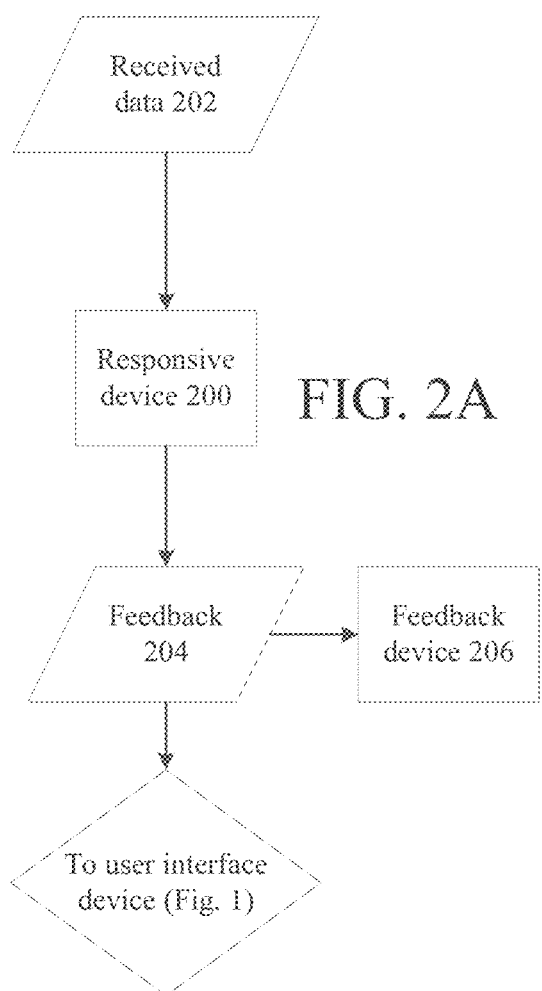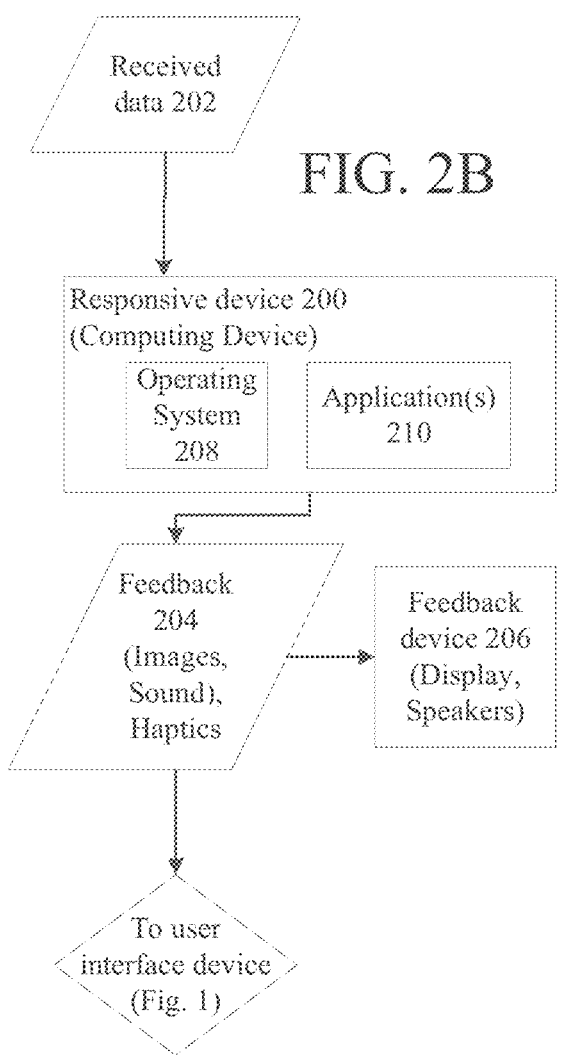

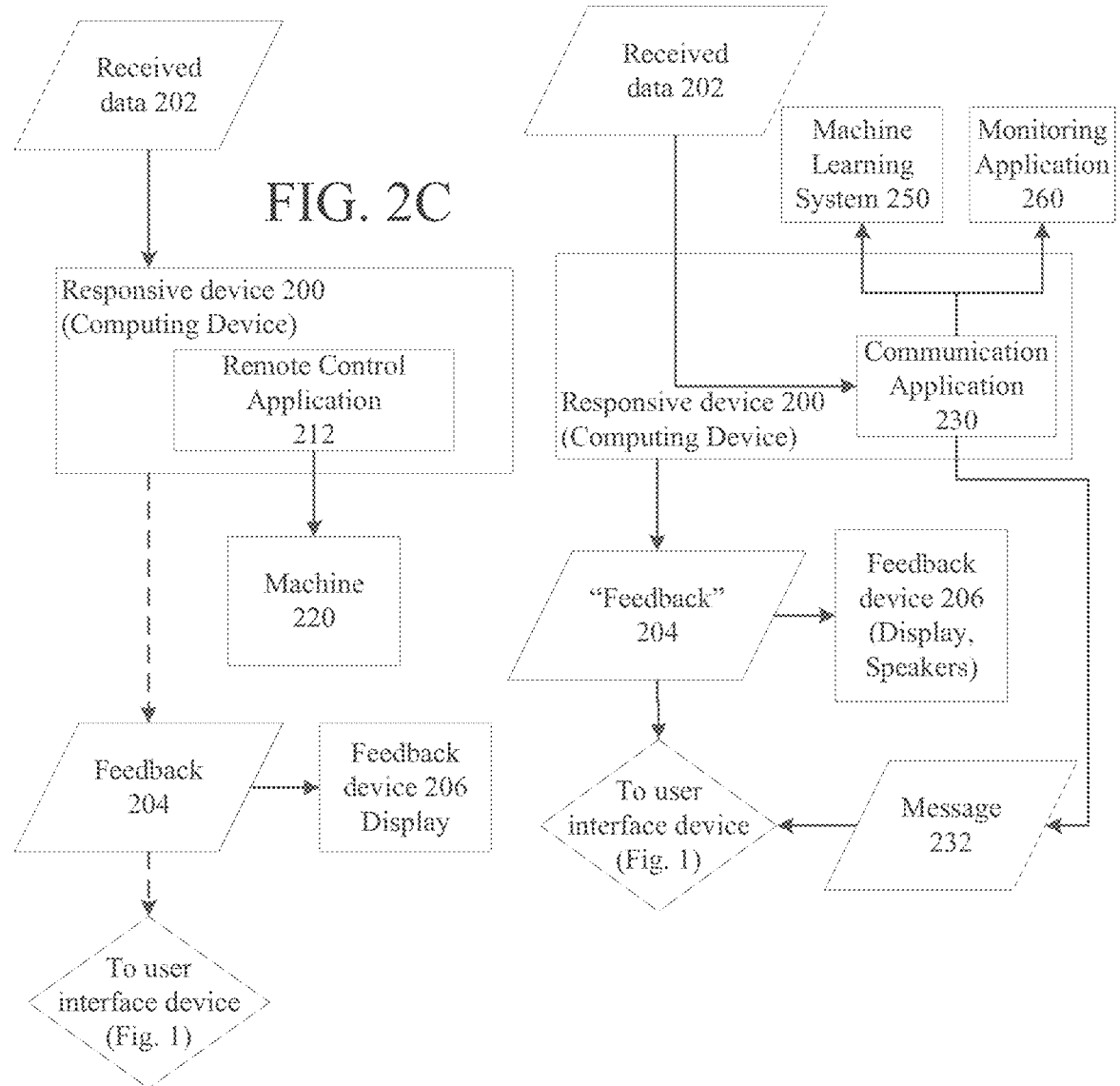

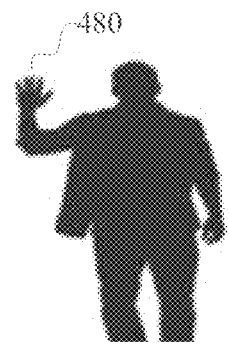
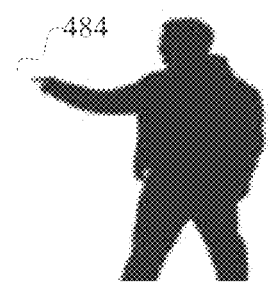
FIG. 4B
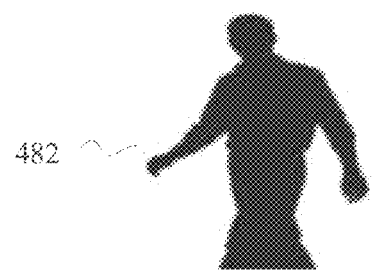

TARGET SELECTION BASED ON HUMAN GESTURES

CROSS-REFERENCE TO RELATED APPLICATIONS

This application is a continuation of U.S. patent application Ser. No. 16/890,507, filed Jun. 2, 2020, which is a continuation-in-part of U.S. patent application Ser. No. 16/774,825, filed Jan. 28, 2020.

This application is related to U.S. patent application Ser. No. 16/104,273, filed Aug. 17, 2018, pending, which is a continuation of U.S. patent application Ser. No. 15/826,131, now U.S. Pat. No. 10,070,799 issued Sep. 11, 2018, which is a nonprovisional application of U.S. provisional patent application 62/566,674, filed Oct. 7, 2017, and U.S. provisional patent application 62/429,334, filed Dec. 2, 2016, all of which are hereby incorporated by reference.

This application also is related to U.S. patent application Ser. No. 16/055,123, filed Aug. 5, 2018, pending.

This application also is related to U.S. patent application Ser. No. 16/246,964, filed Jan. 14, 2019, pending.

This application also is related to PCT Patent application serial number PCT/US19/061421, filed Nov. 4, 2019, pending, which is an international application designating the United States claiming priority to U.S. patent application Ser. No. 16/196,462, filed Nov. 20, 2018, pending.

This application also is related to U.S. patent application Ser. No. 16/737,252, filed Jan. 8, 2020, pending.

All of the foregoing are hereby incorporated by reference.

BACKGROUND

Most machines have a form of "user interface" through which a person interacts with the machine. The person provides inputs through one or more devices from which the machine interprets the person's intent. The machine provides feedback to the person in response to those inputs, such as by the behavior of the machine or by outputs through one or more devices which present information to the person.

When the machine is or includes a computer system with a display, a common paradigm for the user interface is a "graphical user interface". With a graphical user interface, the person manipulates a user interface device which provides input to an application running a computer. In turn, the computer provides visual output on a display. The computer may provide other outputs, such as audio. Through the user interface device, the person can control a position of a graphical object, typically called a cursor, within a display, and can indicate an action to be performed. The action to be performed typically is based in part on the position of that graphical object within the information presented on the display. A variety of user interface devices have been created for computers. Likewise, many kinds of graphical user interfaces and other kinds of user interface paradigms have been used with computers.

SUMMARY

This Summary introduces a selection of concepts in simplified form that are described further below in the Detailed Description. This Summary neither identifies features as key or essential, nor limits the scope, of the claimed subject matter.

The graphical user interface paradigm for interacting with a machine or computer can be difficult to use in some environments. In some environments, a computing device may have a small display or no display at all. Further, in some environments, users may not be able to easily manipulate any input devices, because they are grasping or holding another object. For a variety of reasons, in some environments, the typical combination of an input device and a display does not provide a sufficiently intuitive, workable, convenient, or safe form of interaction with a machine.

Further, most graphical user interfaces for a computer are based on interaction of a user with graphical objects presented on a display or objects otherwise known to and presented by the computer on the display. An input from a user tends to be associated with a location within the display space known to and controlled by the computer.

As described herein, a human-machine interface is provided in which one or more users provide one or more inputs indicative of a real-world, geographical location, from which a geographical location is determined. Each of the one or more users has a respective user interface device from which a respective input is received. A responsive device receives and processes an input from at least one user interface device. There may be multiple responsive devices, each receiving inputs from one or more user interface devices. A responsive device, or another computing device in communication with the responsive device, can determine a geographic location based on one or more inputs received. Feedback can be provided to at least one user regarding the determined geographic location.

Some example scenarios from which a geographic location can be determined include, but are not limited to, the following.

An individual may be pointing in a specific direction, such as north, or south, and may want information about what is in that general direction. An individual may point at a street corner or a building and may want information about it, or simply to identify it. An individual may point at a direction and may want to set a point on a map. An individual may point in a direction to identify an object, such as to spot a deer or other animal while hunting, or for communicating during a game or other activity.

Multiple individuals can be pointing at roughly the same location or a same object. Multiple users may want to cooperate to select or identify the same object. Multiple users may want to cooperate to select or identify multiple objects. The object or objects may be moving. For example, multiple firefighters can be pointing at a same window or other position on a building. Multiple individuals on a street can be pointing at the same vehicle on the street. For example, several police officers can be pointing at the same car. Multiple individuals in a venue may be pointing at roughly the same location. Multiple people in a city park may be pointing at an object. For example, security personnel for a venue may be pointing at the same person, or at an open door, or at an object. Multiple people on a search and rescue mission may identify an object, or a person or an animal to be rescued, or a hazard or obstacle.

The selected geographic location can be used to control communication. For example, an individual can point at another individual and initiate communication directly with that individual. An individual can select a group of individuals, such as by pointing at them individually or selecting them as a group with a gesture, to communicate with the group. An individual can, with a gesture such as pointing to the sky, initiate communication with a predetermined set of individuals. Similarly, communication with, or control of, or both, objects can be performed by pointing at an individual object, selecting a group of objects within a set, or selecting a predetermined set of objects.

The geographic location can be defined as an absolute location or a relative location. Examples of absolute locations include, but are not limited to, coordinates in a map system, geographical positioning system (GPS) coordinates, or longitude and latitude in various resolutions, or any combination of these. Examples of relative locations include, but are not limited to, a reference point and a direction, or a reference point and a direction and a distance, a plurality of reference points and respective directions from those reference points, or a plurality of reference points and respective directions and distances from those reference points, or any combination of these.

The geographic location can be determined based on inputs from sensor data from a sensor associated with at least one person. Additional sensor data from sensors associated from one or more other persons, or one or more other objects, or a combination of these, can be used to determine the geographic location. Examples of such sensors include at least any one or more of the following: a location sensor (as described below), a geomagnetic sensor, a compass, a magnetometer, an accelerometer, a gyroscope, an altimeter, an eye tracking device, an encoder providing information indicating a change in position, a camera providing image data or motion video, a reference to a known landmark, or sound sensor, such as one or more microphones, or other sensor that can provide an indication of a direction from a person, or any combination of two or more of these. The sensor data can be interpreted as, for example, any of a number of primitive gestures by the person, an intended action, an arm angle or other indication of relative vertical location, a direction or bearing, a distance, or an altitude or any combination of these. The geographic location can be determined based on such sensor data received from sensors associated with one or more persons.

In some implementations, the determination of the geographic location can be assisted using context data. Such context data can include information, such as a geographic location, of one or more objects, voice, sound, or text data, image data from one or more cameras, map data or user inputs with respect to a map, or any combinations of these or yet other context information.

In some implementations, additional information, such as such context data, can be used to provide inputs to select, control, actuate, or perform other actions related to a geographic locations or an object selected based on the geographic location. For example, voice, gesture, or other data can be used as a modifier. For example, a firefighter pointing at a building can communicate through voice, e.g., "two persons are near the second floor window!". For example, voice, gesture, or other data can be used to annotate a selected object, with different gestures being used to provide different labels for the object, such as "safe" or "dangerous". For example, voice, gesture, or other data can be used to activate a command with respect to an object, with different actions being actuated in different ways. Such actuations can be analogous to a "click", but can be obtained from any other data received from a user.

The geographic location can be determined from the sensor data, and optionally context data, using a variety of different kinds of processing techniques. In some implementations, forms of triangulation can be applied using directions from multiple reference points. In some implementations, an input can allow a user to specify a distance in relationship to a determined location and direction. In some implementations, techniques from computational geometry can be applied, such as variants of simultaneous localization and mapping (SLAM) algorithms which compute a location of an agent, where the geographic location to be determined is treated as the location of the agent to be computed. In some implementations, forms of odometry can be used where change in position over time is determined based on sensor data. In some implementations, visual odometry can be performed on images from cameras. Any combination of such implementations also can be used.

This geographic location in turn can be used in many ways, examples of which include but are not limited to the following and can include combinations of two or more of the following. A geographic location can be used as an input to an application, such as to identify or select an object. Various operations can be performed by an application in connection with a selected object, of which non-limiting examples include invoking tracking of the object by camera, or obtaining information about the object from a database. A geographic location can be data communicated to another user or another machine. A geographic location can be treated as context information when selecting an action to be performed in combination with data based on the signals received from one or more user interface devices. A geographic location can be provided as feedback to a user, such as by displaying a point on a map.

In some implementations described herein, a human-machine interface, such as an interface for interacting with a computer or computer-controlled device, can be implemented by a combination of one or more user interface devices worn by a person, and one or more responsive devices associated with one or more machines or the person. The machine can include, for example, any type of computing device or computer-controlled device. The person performs, or attempts or intends to perform, actions, which are sensed by sensors in the user interface device; the sensors output signals. The responsive device interprets and uses or acts on data received based on the output signals from sensors in the user interface device to enable the person to interact with the machine. Feedback is provided to the person. Such feedback can be provided by the machine, by the responsive device, or by the user interface device, or by other feedback devices, or a combination of two or more of these. As described in more detail below, one kind of action that can be performed by a responsive device, and for which feedback can be provided, includes identifying a geographic location.

In some implementations, the user interface device is worn by a person on a body part and includes at least a biopotential sensor and a location sensor. The body part on which the user interface device is worn is an appendage which persons typically are capable of moving with respect to their torso. Also, at that appendage, biopotentials related to activity of muscles that control a body part can be sensed at the skin surface, where the muscle activity enables the person to cause, or intend to cause, certain poses, as explained herein, of the body part.

In the example of a wrist-worn user interface device, the user interface device is constructed to be worn by a person so that at least one biopotential sensor is placed at least at the top of the wrist, as explained herein, to sense biopotentials at the top of the wrist. The biopotentials sensed at the top of the wrist are related to activity of muscles that control the hand and fingers. Any pose, as explained herein, of the hand is a result of activation or relaxation of these muscles. Biopotential signals are generated in response to a person intending to form any pose of the hand; the pose of the hand might not be formed in some cases, such as when the person has a neuromuscular condition. The biopotential sensor has an output providing a biopotential signal indicative of the sensed biopotentials.

In the example of a wrist-worn user interface device, the location sensor senses location, as explained herein, of the wrist with respect to a reference point and has an output providing a location signal indicative of the sensed location. Different kinds of location sensors may use different reference points.

The responsive device is a kind of machine, typically a computing device, which receives, from the user interface device, data based on the biopotential signals and based on the location signals. The responsive device performs actions based on the received data. The received data may be the output signals from the sensors, or may be data representing information derived from processing these signals, such as data obtained from filtering or transforming these signals, data indicative of features extracted from these signals, pose or location information derived from the foregoing, or data representing primitive gestures detected from these signals, or other data obtained from processing these signals, or a combination of any two or more of these.

The responsive device is responsive to the received data to detect primitive gestures in the received data, and to cause actions to be performed based on the primitive gestures. A primitive gesture can include a first pose of the hand, or a first location of the wrist, or both, at a first moment in time; and a second pose of the hand, or a second location of the wrist, or both, at a second moment in time following the first moment in time. A primitive gesture can include a "hold" gesture in which the second pose is the same as the first pose.

In some cases, the action to be performed is based on a sequence of detected primitive gestures. In some cases, the action is based on specific detected primitive gestures. In some cases, the action is based on the co-occurrence of two or more detected primitive gestures. In some cases, the action is based on the occurrence of one or more primitive gestures in a particular context.

Typically, the action to be performed is an operation performed by a computing device. This operation typically is performed by an application running on the computing device. A computing device may have several applications running. When interacting with multiple applications through a user interface device, the computing device is instructed to provide an input to a selected application, and that input causes the selected application to perform a selected operation. The primitive gestures detected in the data received from the user interface can be used to select the application, or select the input to be provided to an application, or both.

As an example, the responsive device can direct inputs to a selected application, and the selected application can perform an action in response to a detected pose of the hand occurring after a period of time without detected motion of the wrist. Conversely, while motion of the wrist is detected, the responsive device can ignore data based on signals from the biopotential sensor. This behavior can ensure that motion of the wrist does not generate signals that interfere with detecting a pose of the hand.

As an example, the responsive device can select an application based on a detected location of the wrist. Within the selected application, while the wrist remains in the detected location, the application can select and perform an action based on at least a detected pose of the hand. This behavior can enable, for example, switching between different applications. For example, a person can lift the wrist above the head and lift the index finger to activate an application, and cause that application to perform an action. Afterwards, a person can lower the wrist and lift the index finger to activate another application and cause that other application to perform another action.

As an example, the responsive device can direct inputs to a selected application, and the selected application can select an action based on a detected location of the wrist. The selected action can be performed in response to a detected pose of the hand while the wrist remains in the detected location. This behavior can enable, for example, selecting a menu item or selecting a value within a range of values. For example, an audio playback system can select a song from a playlist, or adjust volume.

As an example, the selected application can perform an action in response to a detected pose of the hand, occurring after a period of time without detected motion of the wrist, followed by a detected hold of the pose accompanied by detected motion of the wrist in a direction. This behavior can enable, for example, selecting of an object by encircling the object, selecting a next or previous item in a list, adjusting scrolling or sliding elements, and other actions. For example, a person can lift the arm, then lift and hold a finger, and then make a circle motion, to select an object.

As an example, the responsive device can use a detected pose of the hand to initiate and terminate a mode of operation that performs operations primarily based on the location of the wrist. This behavior can enable, for example, enabling a mode of operation to control movement on an object, such as a drone, based on motion of the wrist. For example, in response to a lift and hold of a finger, a remote control mode for a drone can be activated, in which wrist location controls motion of the drone.

Operations also can be performed based on any other information from other sensors on the user interface device. Operations also can be performed based on any context information available to the responsive device.

Such behavior in a responsive device enables a wide range of user experiences for interacting with a machine in a variety of contexts. When the pose of the hand used to interact with the machine can be performed while a person is grasping or holding another object, such as lifting a finger, the user interface device enables the person to interact with the machine while performing other activities. When the pose of the hand used to interact with the machine can be performed discreetly, or with minimal motion or movement, such as when a person has the hand in a pocket, the user interface device enables the person to interact with the machine conveniently or safely or secretly in challenging environments. When the pose of the hand or location of the wrist used to interact with the machine is intuitive, such as pointing and swiping, the user interface device enables the person to interact with the machine intuitively.

Accordingly, in one aspect, an apparatus includes a sensor constructed to be worn by a person and configured to sense information indicative of a direction intended by the person. The apparatus includes a processor, and storage for instructions executable by the processor. When executing the instructions, the processor determines the direction based on the information sensed by the sensor, and, based on the direction and a location of the person, determines a geographic location.

In another aspect, a responsive device is constructed to communicate with a user interface device. The responsive device includes a processing system comprising a processing device and computer storage. The computer storage has computer program instructions stored thereon which, when processed by the processing device, configure the responsive device. The responsive device is configured to receive sensor data from the user interface device and determine a geographical location.

In some implementations, the apparatus includes a biopotential sensor and a location sensor. The biopotential sensor is constructed to be worn by a person and to respond to an intention expressed by the person. The biopotential sensor is configured to sense biopotentials appearing on the person. The biopotentials are associated with muscles controlling a body part or controlling an appendage near the body part. The location sensor is configured for sensing location on the person. A processor, with storage for instructions executable by the processor, detects a primitive gesture representative of the intention expressed by the person, based on the sensed biopotentials and sensed location. In response to the primitive gesture, the processor determines the geographic location.

In some implementations a responsive device is configured to receive data based on a biopotential signal and data based on a location signal. The responsive device is configured to detect a primitive gesture representative of the intention expressed by the person. In response to the primitive gesture, the processor determines the geographic location.

Any of the foregoing can include one or more of the following features. The sensor comprises a biopotential sensor constructed to be worn by the person and configured to sense biopotentials appearing on the person. The sensor comprises a location sensor constructed to be worn by the person and configured to sense a location for the person. The sensor comprises an eye tracking device. The sensor comprises a geomagnetic sensor. The sensor comprises an altimeter. The sensor comprises an encoder providing information indicating a change in position.

Any of the foregoing can include one or more of the following features. The body part is the wrist. The appendage is the hand. The appendage includes one or more fingers of a hand. The pose is a pose of the hand. The pose of the hand includes a pose of one or more fingers. The pose of the hand includes a movement of one or more fingers. The pose of the hand includes a pose of a single finger. The pose of the hand includes movement of a single finger. The single finger is the thumb. The single finger is the index finger. The pose of the hand includes a position of the hand relative to the wrist. The primitive gesture comprises a finger swipe. The primitive gesture comprises a finger lift. The primitive gesture comprises a finger hold. The location of the wrist comprises a position of the top of the wrist. The location of the wrist comprises an orientation of the top of the wrist. The location of the wrist comprises motion of the top of the wrist.

Any of the foregoing can include one or more of the following features. The location sensor comprises an accelerometer that generates location signals comprising a signal indicative of direction and magnitude of acceleration of the body part. The location sensor comprises a gyroscope that generates location signals comprising a signal indicative of orientation and angular velocity of the body part. The location sensor comprises a geomagnetic sensor that generates location signals comprising a signal indicative of a heading.

Any of the foregoing can include one or more of the following features. The geographic location is determined based on a first geographic location of the person, a first direction based on at least the sensor data, and a second direction from a second geographic location. The second geographic location is of a second person. The second direction is a direction indicated by the second person. The second geographic location is a location derived based on a signal from a device carried by the person. The second direction is a direction derived based on a signal from a device carried by the person.

Any of the foregoing can include one or more of the following features. The geographic location is determined based on data indicating a geographic location of the person and a direction and a distance along the direction. The distance along the direction is based on at least one of the biopotential signals or the location signals from the person. The determined geographic location specifies a point on a map. In response to a detected primitive gesture, the processor modifies the location of the specified point on the map.

Any of the foregoing can include one or more of the following features. The geographic location is determined based on a selected object. In response to a geographic location of a person, and in response to a detected primitive gesture, an object having a geographic location is selected. The geographic location of the selected object is the determined geographic location. The geographic location of the selected object is based on accessing information about the geographic location of the selected object from a database. The geographic location of the selected object is based on computing the geographic location of the selected object based on time of flight data of the object.

Any of the foregoing can include one or more of the following features. The location on the person comprises a position of the top of the wrist. The location on the person comprises an orientation of the top of the wrist. The location on the person comprises motion of the top of the wrist.

Any of the foregoing can include one or more of the following features. The processor determines the geographic location by receiving data indicating a first geographic location of the person, determining a first direction based on the sensor data received from the user interface device worn by the person, determining a second direction from a second geographic location, and determining the geographic location based on the first geographic location and the first direction, and on the second geographic location and the second direction. The second geographic location comprises a geographic location of a second person. The second direction comprises a direction indicated by the second person. The second geographic location comprises a location derived based on a signal from a device carried by the second person. The second direction comprises a direction derived based on a signal from a device carried by the second person. The second geographic location comprises a location of a second sensor. The second direction comprises a direction based on signals from the second sensor.

Any of the foregoing can include one or more of the following features. The processor determines the geographic location by receiving data indicating a geographic location of the person and a direction, and based on the sensor data, determining a distance along the first direction, and determining the geographic location based on the geographic location of the person, the direction, and the determined distance. The determined geographic location specifies a point in coordinates associated with a map. In response to a detected primitive gesture, the processor modifies the location of the specified point.

Any of the foregoing can include one or more of the following features. To determine the geographic location, the processor is configured to, in response to a geographic location of a person, and in response to the sensor data, select an object having a geographic location, provide the geographic location of the selected object as the determined geographic location. The geographic location of the selected object comprises accessing information about the geographic location of the selected object from a database. The geographic location of the selected object comprises computing the geographic location of the selected object based on time of flight data of the object.

Any of the foregoing may be embodied as a computer system, as a component of such a computer system, as a process performed by such a computer system or a component of such a computer system, or as an article of manufacture including computer storage in which computer program code is stored and which, when processed by the processing system(s) of one or more computers, configures the processing system(s) of the one or more computers to provide such a computer system or a component of such a computer system.

The following Detailed Description references the accompanying drawings which form a part this application, and which show, by way of illustration, specific example implementations. Other implementations may be made without departing from the scope of the disclosure.

BRIEF DESCRIPTION OF THE DRAWINGS

FIGS. 2A-2D are block diagrams of example implementations of a responsive device.

FIG. 4B illustrates example locations of the top of the wrist.

DETAILED DESCRIPTION

As described herein, a human-machine interface, such as an interface for interacting with a computer or computer-controlled device, is implemented by a combination of one or more user interface devices worn by a person, and one or more responsive devices associated with one or more machines or the person. The machine can include, for example, any type of computing device or computer-controlled device.

The person performs, or attempts or intends to perform, actions, which are sensed by sensors in the user interface device; the sensors output signals. The responsive device interprets data received based on the output signals from sensors in the user interface device to enable the person to interact with the machine. Feedback is provided to the person. Such feedback can be provided by the machine, by the responsive device, or by the user interface device, or by other feedback devices, or a combination of two or more of these. As described in more detail below, one kind of action that can be performed by a responsive device, and for which feedback can be provided, includes identifying a geographic location.

There are many possible configurations and interrelationships of user interface device, responsive device, and machine, some of which are described in more detail below in connection with FIGS. 2A-2D. Typically, the user interface device, responsive device, and machine may be separate devices. Two or more of the devices may be integrated into the same device, such as: a single device incorporating both a user interface device and a responsive device (e.g., a smart watch controls another machine); a single device incorporating both a responsive device and a machine (e.g., a user interface device interacts with a smart phone or tablet or computer); and a single device incorporating the user interface device, responsive device, and a machine (e.g., a smart watch). The devices may be partially integrated into the same device, such as when functionality described herein as residing in a responsive device is located in a user interface device (as noted in more detail below in connection with FIG. 3). There may be multiple instances of user interface devices, or of responsive devices, or of machines, or of combinations of them. For example, in some cases, multiple user interface devices may be worn by one person, with respective user interface devices worn on respective parts of the body, such as different wrists or ankles. In some cases, multiple user interface devices may be worn by multiple different people, such as a first person wearing a first user interface device and a second person wearing a second user interface device, with both user interfaces connecting to one or more responsive devices. The connections among the devices can be implemented in many ways, including wired and wireless communication, computer networks, computer bus structures, and the like, and combinations of them.

Figure 1A:
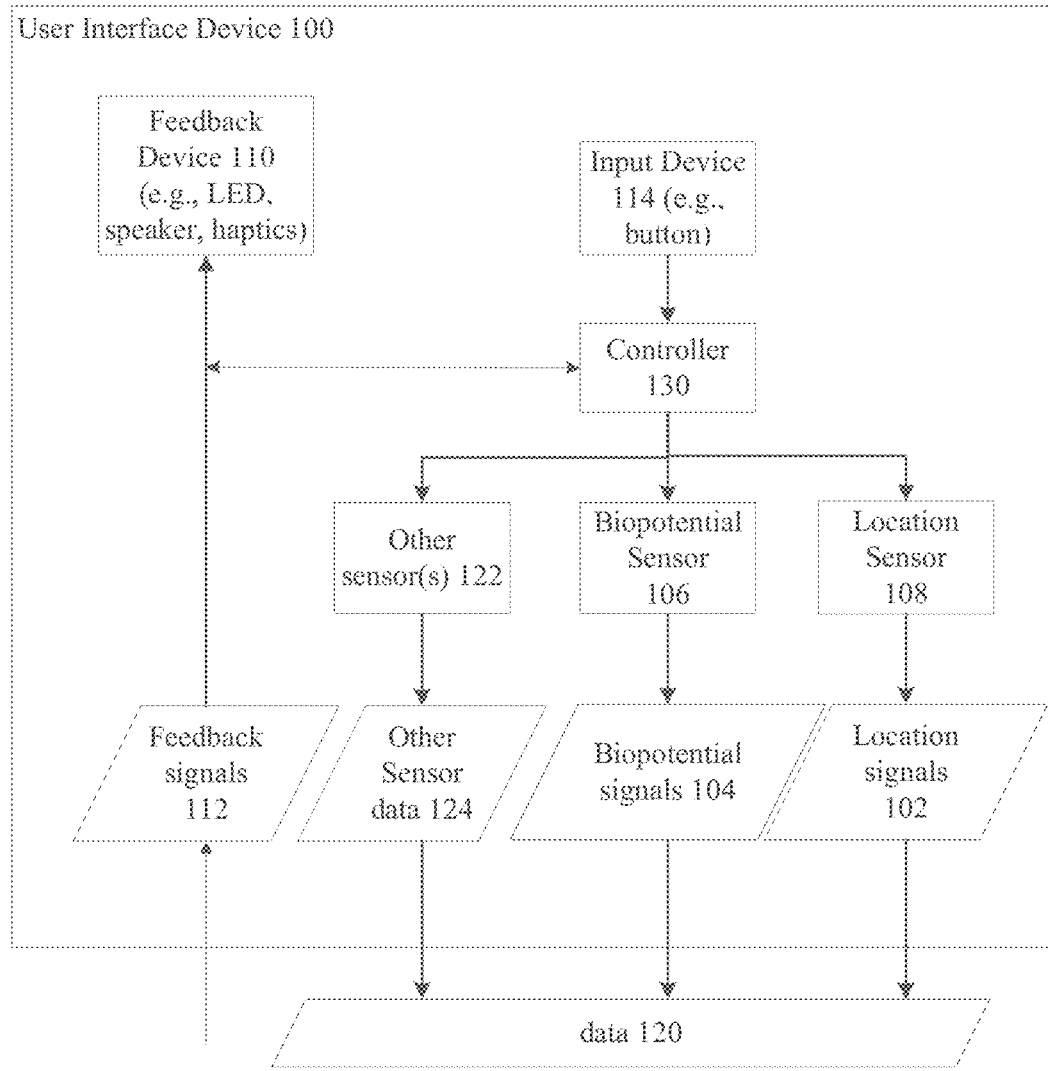
FIG. 1A is a block diagram of a user interface device.

FIG. 1A schematically illustrates a block diagram of a circuit in a user interface device 100 worn on a person. The body part on which the user interface device can be worn can be an appendage which persons typically are capable of moving with respect to their torso, for example, the arm at the top of the wrist. Also, at this appendage, biopotentials related to activity or intended activity of muscles that control a body part can be sensed at the skin surface, where the muscle activity enables the person to cause, or intend to cause, certain poses of the body part.

While such a user interface device can be worn on many different body parts of the person, the user interface device will be described herein using an example of wearing the user interface device such that at least one biopotential sensor is placed at the top of the wrist. The phrase "top of the wrist" as used herein is intended to mean the posterior surface of the arm at or near the distal end of the arm adjacent to the joint (i.e., the wrist) connecting the hand to the arm (described in more detail below in connection with FIGS. 4A-4C).

In some implementations, in the case where the user interface device is worn at the top of the wrist, the user interface device 100 outputs data 120, including at least signals 102 indicative of location of the wrist relative to a reference point and signals 104 indicative of biopotentials related to activity of muscles that control the hand and fingers of the hand connected to the wrist. To produce these signals, the user interface device 100 has at least two sensors, a biopotential sensor 106 and a location sensor 108. When the user interface is worn on another body part on the person other than the wrist, the user interface device will output signals indicative of the location for that body part with respect to a reference point and biopotentials sensed at the skin surface at that body part.

The phrase "location" is intended to mean any data describing, at least in part, position or orientation with respect to a reference point, a heading, or changes in any of these, such as velocity, angular velocity, acceleration, or angular acceleration, or any combination of two or more of these. Within a frame of reference, such as a coordinate system associated with a person's body, the reference point may be absolute (such as an origin in a frame of reference) or relative (such as a previously known location). Different kinds of location sensors may use different reference points. Location may be represented in coordinates, in one, two, or three dimensions, whether in cartesian, radial, or spherical coordinates, or as a vector. Location also may be expressed in relative terms, such as high, low, left, right, far, and near and combinations of them. As used herein, "motion" of a body part such as the wrist is intended to signify a change in the position or orientation, or both, of the body part over time with respect to the reference point. Typically, a change in position or orientation of the top of the wrist is due to arm motion, and is referred to herein is wrist motion or arm motion. Other movements of the hand or finger, though possibly occurring at or near the wrist (or other body part), such as bending of the hand or extension or contraction of one or more fingers (or similar body part), are herein called "movement".

"Biopotentials" are electrical signals propagating in the body which can be noninvasively sensed on the surface of the skin and which are indicative of nerve signals transmitted to muscles, electrical activity of muscles in response to such nerve signals, and other electrical activity within tissues. When sensed at the top of the wrist, such biopotentials are related to activity of the muscles that control the hand and fingers, including movement of a single finger or groups of fingers with respect to the hand or to each other, and movement of the hand with respect to the arm, and any combination of these. The phrase "related to activity of muscles" is intended to include any one or more of nerve signals, muscle tissue signals, signals related to intended muscle movement (whether or not actualized), or signals related to unintended muscle movement (whether or not actualized), or any combination of two or more of these. The muscle movement may or may not be actualized depending on the condition of the person. The person may have a disease, such as atrophic lateral sclerosis (ALS) in which the muscles do not move as intended or do not move at all, but nerve signals still can be generated for intended muscle movement. The person may be otherwise constrained, such that muscle movement does not occur, but nerve signals and possibly muscle tissue signals are generated. In some instances herein, the text refers to movement of a body part, such as movement of a finger. Those instances should be understood as a short reference and include not only actual movement of the body part, but also intended, but not actualized, movement of that body part, in which case the biopotential signal indicates intended muscle movement for controlling that body part.

The user interface device 100 also can output feedback to the person through one or more feedback devices 110, examples of which are described in more detail below. The user interface device 100 may receive feedback signals 112 related to the feedback devices 110. The user interface device 100 may generate (e.g., by controller 130) the feedback signals 112 for the feedback devices 100. The user interface device 100 may not be the sole source of feedback to the user, as such feedback can be provided from the responsive device, the machine, or other feedback device. In some implementations, the user interface device 100 may not have any feedback device. For example, a flashing light may indicate that the user interface device is communicating with the responsive device, or, a vibration may indicate that the responsive device has completed an action.

The user interface device 100 also may have one or more input devices 114, such as a button, through which the person can provide inputs intentionally or unintentionally directly to the user interface device 100.

The user interface device 100 typically communicates over a wireless connection with the responsive device. The user interface device may be powered by battery. The user interface device, when separate from the responsive device, can communicate with the responsive device (to send data 120 and receive feedback signals 112) through a wireless transceiver (not shown).

The various components of the user interface device, e.g., 106, 108, 110, 114, and 122, interact with a controller 130. The controller is connected to these components to control their operation. The controller can include an analog-to-digital converter that samples, downsamples, or upsamples the outputs of the sensors 106, 108, 122 to provide a sequence of digital samples at a desired sampling rate from the output signals of the sensors. The controller 230 can include any other circuit that processes or conditions the data 102, 104, and 124 prior to sampling, such as any amplifier or band pass, notch, high-pass or low-pass filtering.

The biopotential sensor 106 senses biopotentials at the location on the body where the user interface device is worn, such as at the top of the wrist. The biopotential sensor 106 provides one or more output signals, i.e., biopotential signals 104, indicative of the sensed biopotentials.

The biopotential sensor 106 comprises one or more pairs of electrodes. Each pair of electrodes is called a "channel" herein, as described above in connection with FIG. 1C. When the user interface device 100 is worn on the wrist, the electrodes are arranged to be in contact with the skin at the top of the wrist and the electrodes within each pair are oriented such that a first electrode is closer to the fingers than a second electrode of the pair. In some implementations, the kinds of electrodes and circuitry as described in related applications listed above, or in FIG. 1C above, can be used to provide each channel of the biopotential sensor 106.

A differential signal can be generated from the outputs of each pair of electrodes. The differential signal can be generated from the outputs of each pair of electrodes by using an operational amplifier, such as described in U.S. Pat. No. 10,070,799. In implementations using a reference electrode for additional noise rejection, such as electrode 180 in FIG. 1C, the differential signal also can incorporate the signal from the reference electrode. For example, given a signal (e1) for a first electrode, a signal (e2) for a second electrode, and a signal (r) for the reference electrode, the reference signal (r) can be first subtracted from the signals (e1, e2) of the first and second electrodes, which can be performed in the analog domain, before generating the differential signal for the pair of electrodes, such that the differential signal for the pair of electrodes can be expressed as: (e1-r)−(e2-r). The differential signal can be the output of the channel. The outputs from one or more channels make up the biopotential signals 104.

The biopotential signals 104 are used to detect poses of the hand, or a pose of another body part near which the user interface device is worn. A "pose of the hand" includes a position or a movement of one or more fingers relative to the hand, or a position or a movement of the hand relative to the wrist, or any combination of these. Accordingly, a system is designed and implemented, in a relatively simple case, to detect at least a first pose, and distinguish that first pose from the lack of any pose. If a second pose is introduced, then the system is designed to distinguish the first pose from the second pose, and the first and second poses from the lack of either pose. The biopotential sensor 106 therefore is designed based on the application, such that biopotentials sensed by the biopotential sensor 106 carry sufficient information to enable detection of a specific pose by the person both compared to noise and compared to other specific poses to be detected.

In applications where the user interface device is worn at the top of the wrist, the biopotential signal may be processed to detect a pose of the hand. This processing can involve distinguishing between movement of any finger and no movement of any finger. This processing can involve distinguishing one kind of movement of one finger from a different movement of the same finger or from the same or different movement of a different finger. This processing can involve distinguishing one pose of the hand from another pose of the hand. The biopotential sensor can be a single channel, comprising a single pair of electrodes. The biopotential sensor can have only two channels, with each channel having a single pair of electrodes. The biopotential sensor can have only three channels. The biopotential sensor can have four or more channels. The output signals from the biopotential sensor can be processed using information from other sensors to help distinguish among different poses of the hand.

Within a single channel, larger spacing between the electrodes improves the ability of an output differential signal for that channel to provide more meaningful information. With two or more channels, larger spacing between the two channels improves signal separation and reduces crosstalk. The spacing of the electrodes ("electrode spacing") and the spacing of the channels ("channel spacing") are related to, and thus selected based on, characteristics of the biopotentials propagating within the part of the body on which the user interface device is intended to be worn.

For some applications, each pair of electrodes can be positioned to optimize capture of nerve signals. Capturing nerve signals can be helpful for applications where the person is known to have a neuromuscular condition such as atrophic lateral sclerosis (ALS) or otherwise may be constrained from having actual muscle movement. For example, on the top of the wrist, electrode pairs can be placed to emphasize capture of nerve signals related to the median nerve, ulnar nerve, or radial nerve, or any combination of these. However, in many implementations, the placement of two differential channels on the top of the wrist with sufficient spacing provides sufficient information without requiring careful placement related to a specific nerve.

In some applications, the signal acquisition from the electrodes can include a form of dynamic impedance matching, such as described in U.S. Pat. No. 10,070,799. The operational amplifier providing the differential signal of the two electrodes in the channel can be connected to a variable resistor which is adapted to match the impedance of the skin. Without dynamic impedance matching, the sensor still may naturally adapt to the impedance of the wearer's skin after a few minutes of wearing. However, implementing dynamic impedance matching in hardware may adapt the sensor to the person more quickly.

As described in U.S. Pat. No. 10,070,799, the biopotential signal can include portions of signals from a variety of sources, including neural, neuromuscular, muscular, and external sources (such as radio waves). Some processing can be performed to reduce the influence of unwanted signals, such as by using notch filters and band pass filters. Typically, external noise tends to be at 60 Hz and integer multiples thereof, so notch filters for these different frequencies can be used. Muscle contraction electrical signals have a frequency range of 20 Hz to 300 Hz with dominant energy in the 50 Hz to 150 Hz range. Nerve signals typically have a frequency range of about 200 Hz to about 1000 Hz. One band-pass filter can be applied to attempt to focus on nerve signals. Another band-pass filter can be applied to attempt to focus on muscle signals. A band pass filter for frequencies of 20 Hz to 1000 Hz can be used to focus on both nerve and muscle signals. As described in more detail below, such filtering can be performed by the biopotential sensor 106 or another component on the user interface device, or can be part of signal processing performed by another part of the system.

As noted above, a location sensor 108 senses location of part of the body where the user interface device is worn, such as at the top of the wrist, with respect to a reference point. When sensed at the top of the wrist, the sensed location is indicative of the location of the wrist relative to a reference point. The reference point can depend on the kind of location sensor. Examples include, but are not limited to, an absolute point, such as an arbitrary reference point with respect to the body, or the head or mouth or other specific body part, or a relative point, such as a previously sensed location. The location sensor 108 provides an output signal, e.g., location signals 102, indicative of the sensed location. The concept of location of the body part, with a wrist-worn user interface device, is explained in more detail below in connection with FIG. 4A.

As an example, the location sensor 108 may include one or more of an accelerometer, a gyroscope, a geomagnetic sensor or other form of magnetometer, or combination of two or more of these. For example, an inertial measurement unit or IMU can be used, which includes at least an accelerometer and gyroscope, but also may include a geomagnetic sensor. An example of a commercially available product which can be used as the location sensor 108 is a 9-axis sensor combining three types of devices (accelerometer, gyroscope, and geomagnetic sensors), such as a Bosch BNO055 absolute orientation sensor. Such a sensor can be used to provide sensor data for determining a geographic location.

An accelerometer comprises a device that measures its own acceleration along one or more axes and provides an output signal in response to stress or other force induced by the acceleration within the device. Given an initial position and acceleration data from an accelerometer in three axes, a processing device can determine a position and orientation of the wrist in a three-dimensional space relative to its initial position. Such a sensor can be used to provide sensor data for determining a geographic location.

A gyroscope comprises a device that measures orientation and angular velocity along one or more dimensions. Given signals from a gyroscope in three dimensions, one can determine orientation of the wrist in a three-dimensions relative to an initial orientation. Such a sensor can be used to provide sensor data for determining a geographic location.

A geomagnetic sensor comprises a device that measures the earth's magnetic field to provide a signal indicative of the measured magnitude and orientation of the field. Given signals from a the geomagnetic sensor, a processing device can determine a location, e.g., a direction or heading relative to a magnetic pole of the earth. Such a sensor can be used to provide sensor data for determining a geographic location.

The location sensor 108 can include one or more sound detection devices, such as a single microphone or a plurality of microphones. The sound detection device can be a microphone array including a plurality of microphones spaced apart on the user interface device 100. The sound detection device can be a microphone and resonant device on the user interface device 100. The sound detection device outputs audio signals. The audio signals can be processed to determine the location of the wrist with respect to a location of a sound source, such as the mouth. An example implementation of such is found in co-pending patent application entitled "A Wearable Device Including a Sound Detection Device Providing Location Information for a Body Part", by Dexter Ang and David Cipoletta, Ser. No. 16/737,242, filed on Jan. 8, 2020, and hereby incorporated by reference. Such a location can be computed using sound source localization techniques. For example, the sound source can be a mouth of the person wearing the user interface device. Sound detection devices can be used in combination with any one or more other kinds of location sensors. Sound detection devices can be used to provide sensor data for determining a geographic location.

The user interface device also can include yet additional sensors (e.g., 122) of one or more other types which output other sensor data 124. Examples of types of sensors that can be used as the additional sensors include, but are not limited to, any device that can sense, detect, or measure a physical parameter, phenomenon, or occurrence, such as global positioning system (GPS) sensors, moisture sensors, temperature sensors, visible light sensors, infrared sensors, image capture devices such as cameras, audio sensors, proximity sensors, ultrasound sensors, radio frequency signal detectors, skin impedance sensors, pressure sensors, electromagnetic interference sensors, touch capacitance sensors, and combinations of them.

A geographic location can be determined based on inputs from sensor data from a sensor associated with at least one person. Additional sensor data from sensors associated from one or more other persons, or one or more other objects, or a combination of these, can be used to determine the geographic location. Examples of such sensors include at least any one or more of the following: a location sensor (as described below), a geomagnetic sensor, a compass, a magnetometer, an accelerometer, a gyroscope, an altimeter, an eye tracking device, an encoder providing information indicating a change in position, a camera providing image data or motion video, a reference to a known landmark, or sound sensor, such as one or more microphones, or other sensor that can provide an indication of a direction from a person, or any combination of two or more of these. The sensor data can be interpreted as, for example, any of a number of primitive gestures by the person, an intended action, an arm angle or other indication of relative vertical location, a direction or bearing, a distance, or an altitude or any combination of these. The geographic location can be determined based on such sensor data received from sensors associated with one or more persons.

In some implementations, a user interface device can include a sensor for sensing data for determining a geographic location without biopotential sensors or location sensors. A person can be wearing multiple user interface devices, with different user interface devices having different sensors providing different data.

Turning now to the feedback devices 110, any device (or combination of devices) that provides feedback to the person wearing the user interface 100 can be used. Feedback is any stimulus which is perceptible to the person and which results from the action performed by the responsive device. For the purposes of illustration in FIG. 1A, the user interface device 100 is illustrated as including a feedback device 110. However, in some implementations, a feedback device may be present outside of the user interface device 100, instead of or in addition to any feedback device 110 in the user interface device 100.

As an example, the feedback device 110 can include a source of haptic feedback, also called a haptic device. A haptic device has physical contact with the person, typically by noninvasive contact with the skin, whether directly or indirectly through some material. The haptic device generates a stimulus that can be perceived by the person, typically through the skin (tactile stimulus) or through the sense of motion and position of the limbs (kinesthetic stimulus). Examples of haptic feedback can include, but is not limited to: vibration, motion, force, pressure, acceleration, heat, texture, shape, or other forms of tactile or kinesthetic sensations. The user interface device 100 can receive data from an external source, as indicated by feedback signals 112, for controlling the state of the haptic device. The user interface device 100 can generate or can have stored data for controlling the state of the haptic device, through the controller 130.

As another example, the feedback device 110 can include a light source, such as one or more light emitting diodes. For example, a single light-emitting diode can be placed on a visible surface, from the perspective of the wearer, of the user interface device 100. Of course, multiple light-emitting diodes can be used. The light-emitting diode can produce light of a single color or of multiple colors. The light-emitting diode can produce light of a single intensity or multiple intensities. The user interface device 100 can receive data from an external source, as indicated by feedback signals 112, for controlling the state of the light source. The user interface device 100 can generate or can have stored data for controlling the state of the light source, through the controller 130.

As another example, the feedback device 110 can include a sound source, such as one or more speakers. For example, a small speaker can be placed on a surface directed toward the person wearing the user interface device 100. Of course, multiple speakers can be used. The speaker can be selected based on the desired sound signals to be produced, such as a single tone or frequency, up to a full range of audible sounds, such as music. Sounds can be produced at a single set volume or at varying volumes. Volume can be adjustable by the person, the user interface device, or other device (such as through the feedback signal 112). The user interface device 100 can receive data from an external source, such as indicated by feedback signals 112, for controlling playback of sound on one or more speakers. The user interface device 100 can generate or can have stored data for controlling playback of sound on the one or more speakers, through the controller 130. Such feedback signals can include audio data, or control data, or both.

As another example, the feedback device 110 can include a display, such as an array of N pixels by M pixels which display images. For example, a small display can be placed on a surface directed toward the person wearing the user interface device 100. The display can be selected based on the desired resolution of images to be produced on the user interface device, which may depend on the application, and can support simple text or graphics, up to full-motion video. Controls may be available to adjust the contrast, brightness, color balance and other characteristics of the display, which may be adjustable by the person, the user interface device, or other device (such as through the feedback signal 112). The user interface device 100 can receive data from an external source, such as indicated by feedback signals 112, for controlling display of content on the display. The user interface device 100 can generate or can have stored data for controlling display of content on the display. The feedback signals 112 can include image data, text data, graphics data, video data, or control data, in any combination.

The user interface device 100 also may have one or more input devices 114 through which the person can provide inputs to the user interface device 100. While such input devices are, in some sense, sensors (such as a sensor 122 mentioned above), an input device 114 is intended to mean a device which a person actively manipulates in order to provide a specific input directly to the user interface device, such as a button or touchscreen. Such input devices typically would not produce signals that would be processed as part of the human-machine interface, but instead are for controlling the user interface device, such as powering on the device, initiating network connections, and controlling settings.

Figure 1B:
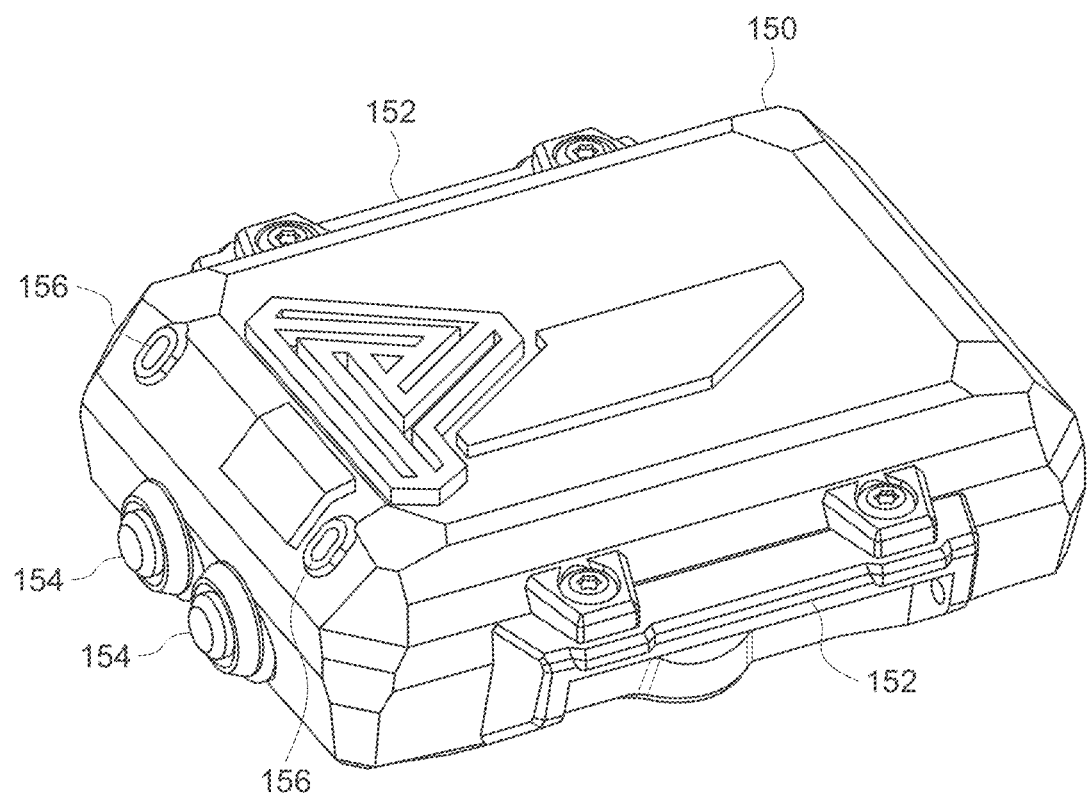
FIGS. 1B-1C are perspective views of an example user interface device.
Figure 1C:
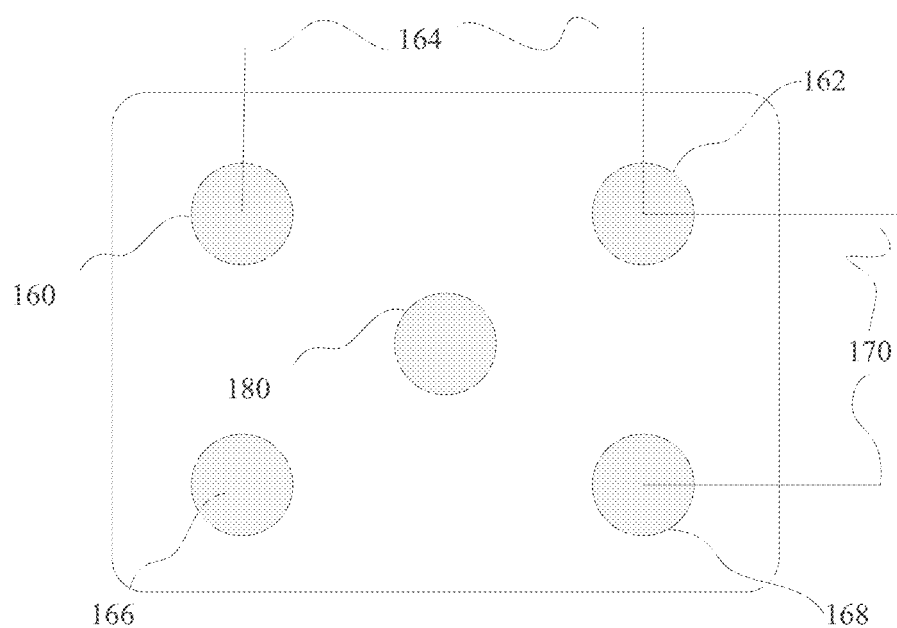

In an example configuration for a wrist worn user interface device, illustrated in FIGS. 1B-1C, a housing 150 contains the circuit shown in FIG. 1A, as well as its corresponding mechanical components. FIG. 1B is a top perspective view; FIG. 1C is a bottom perspective view. Fixtures 152 allow a wrist band or other device (not shown) to connect to the housing 150 to allow the housing to be worn. Buttons 154 are examples of input devices 114 (FIG. 1A); Light emitting diodes (LEDs) 156 are examples of feedback devices 110.

As shown in FIG. 1C, an electrode 160 generally is made of stainless steel or other conductive material. In some implementations, the electrode can be flat disc. In some implementations, the electrode can have a surface with a curvature, such as a conical shape. The diameter of a round electrode is typically greater than 2 mm and less than 10 mm. In some implementations, the electrode can have a diameter of about six millimeters (6 mm).

Within a channel, e.g., a pair of electrodes 160 and 162, the electrodes have an electrode spacing measured between the centers of the electrodes. The electrode spacing 164 can be in the range limited on the low end by the size of the electrodes and a desired spacing between them, e.g., about 15 millimeters (15 mm) where the electrodes are 6 mm in diameter and about 9 mm of material is provided between the near edges of the electrodes, and limited on the high end by the size of the device, e.g., about 25 millimeters (25 mm) where the electrodes are 6 mm in diameter and the device is about 30 mm Generally, a maximum possible spacing is desired, since decreasing electrode spacing results in a lower signal amplitude. In some implementations, the electrode spacing can be about 25 millimeters (25 mm) apart.

With two or more channels, pairs of channels have a channel spacing measured between a first line drawn through electrodes, e.g., 160 and 162, of a first channel and a second line drawn through electrodes, e.g., 166 and 168, of a second channel. The channel spacing 170 can be in the range of about 10 millimeters (10 mm) to 20 millimeters (20 mm). The range is limited by anatomy on the high end and thus depends on the body part on which the device is worn. With the top of the wrist, the high end of the range of channel spacing is about 20 mm Decreasing the channel distance generally results in lower source separation between channels. In some implementations, the channel spacing can be about 15 millimeters (15 mm). In some implementations, the biopotential sensor can include one or more reference electrodes 180, which can be used for noise reduction, as described in more detail below.

Turning now to FIGS. 2A-2D, several kinds of responsive device will now be described. A responsive device 200 is a kind of machine, typically a computing device, which may be associated with one or more machines or one or more other computing devices, or both. The responsive device is responsive to the user interface device 100 to allow the person to interact with a machine, which may be the responsive device itself, or may be a machine or computing device associated with the responsive device.

As shown in FIG. 2A, the responsive device 200 receives data 202 based on the biopotential signals 104 and location signals 102 generated by the user interface device 100. As described in more detail below, the received data 202 may be the output signals 102 and 104 from the sensors, or may be data representing information derived from processing these signals, such as data obtained from filtering or transforming these signals, data indicative of features extracted from these signals, data representing pose or location of a body part derived from these signals, or primitive gestures detected from these signals, or other data obtained from processing these signals, or any combination of these.

The responsive device 200 performs actions based on the received data 202. The responsive device 200 also can generate feedback 204 to the person, such as by the behavior of the responsive device or the machine associated with it, or through the user interface device 100 by sending feedback signals 112 (FIG. 1A) to the user interface device, or through other feedback devices 206 controlled by the responsive device 200. As described in more detail below, the actions to be performed, and the feedback provided to the user, depend on the application, computing device, machine, or other system with which the person is interacting using the user interface device and responsive device. Some examples of such interaction will now be described in connection with FIGS. 2B-2D.

In FIG. 2B, the responsive device 200 is a computing device with which the person interacts. For example, the responsive device can be a computer, such as a general-purpose desktop or laptop computer, smart phone, tablet, game console, set-top box, smart television, or the like. Some computing devices, such as a smart watch, can incorporate both the user interface device and the responsive device within one physical device. In a responsive device 200 in FIG. 2B, the computing device typically has an operating system 208 that supports running one or more applications 210. The user interface device 100 is used by the person to interact with the operating system or the application(s). Feedback 204 from the operating system or the application, typically in the form of images and sound, may be provided through displays, speakers, or other feedback device 206 accessible to the computing device.

In implementations of a configuration such as shown in FIG. 2B, the user interface device can enable the person to interact with a variety of applications running on the responsive device, for example, a media playback application, a camera, a map application, a weather application, a search engine, an augmented reality application, a virtual reality application, a video game, or other application.

In implementations of a configuration such as shown in FIG. 2B, there can be multiple different applications with which the user can interact through the user interface device. In such an environment, selection among these applications is an action, among others, that the responsive device can perform in response to the user interface device.

In FIG. 2C, the responsive device 200 is a computing device running a remote control application 212 that interacts with a machine 220 served or controlled by the computing device. The person interacts with the machine 220 through the responsive device by using the user interface device; in response to data received from the user interface device, the responsive device sends inputs to the remote control application 212. The behavior of the machine 220 is the primary feedback of the system, but other feedback can be provided by the computing device or the user interface device. For example, the remote control application 212 may provide other feedback 204 to a feedback device 206, such as a display of the computing device or to the user interface device.

As an example, the other machine 220 may be a drone, also called an unmanned autonomous vehicle, for which the application 212 includes a remote controller. The application 212 generates control commands which are transmitted to the drone by the computing device under control of the application 212. When the person is using the user interface device, the application can generate these control commands in response to the received data 202 based on the signals generated by the user interface device. For example, the application can activate a remote control session in response to detection of a primitive gesture associated with this function. During the remote control session, locations of the wrist are interpreted by the application as providing directional controls for the drone. The application can end the remote control session in response to detection of a primitive gesture associated with that function.

As another example, the other machine 220 may be another computer, or collection of computers. As another example, the other machine 220 may be an articulated mechanical arm, which may or may not be considered a robot, such as used in manufacturing, telemedicine, or other application. As another example, the other machine 220 may be a mobile robot capable of traversing land or water, having a motor and a form of propulsion driven by that motor.

In FIG. 2D, the responsive device is a computing device 200 with a communication application 230. The communication application 230 can send messages 232 to the person through a feedback device 206. When the person is using the user interface device, the communication application 230 can send the messages 232 to the user interface device 100. The computing device 200, or another computing device (not shown), may in turn receive data 202 from the user interface device. The received data 201 may be responsive to the message 232, and, in the example shown in FIG. 2D, can be directed to the communication application. Feedback 204 also may be provided for a number of purposes, such as to indicate that the computing device 200 received the data 202. Such a communication application can have many forms.

In the example shown in FIG. 2D, the communication application 230 is used to gather labeled data for use in training a machine learning system 250. The responsive device sends a message instructing the person to manipulate the user interface device, for example by performing a specified action. In turn, the responsive device receives data from the user interface device. The responsive device can label that data as corresponding to the manipulation the person was instructed to perform and provided labeled data to the machine learning system 250.

As another example, to monitor the well-being of the person wearing the user interface device, the responsive device may send a message requesting the person to respond. The responsive device then receives data from that person's user interface device. Based on the received data, the responsive device can perform additional actions, for example through a monitoring application 260, such as notify a care provider about the status of the person. An example implementation of such a system is described in co-pending PCT Patent Application PCT/US19/061421, entitled "Communication Using Biopotential Sensing and Tactile Actions", filed Nov. 14, 2019, which is hereby incorporated by reference.

As another example, an incoming message in a messaging application, such as a voice call or text messaging application, can cause the responsive device to transmit a notification message to the user interface device. The responsive device then receives data from that person's user interface device. The responsive device can cause an action to be taken in the messaging application, such as answer a call or respond to a text, in response to the received data from the user interface device.

In any of such implementations of the user interface device 100 and responsive device 200, the signals 102 and 104 generated at the user interface device are transformed into inputs used by the applications on the responsive devices. Such transformation may be performed by one or more processing devices, which may reside on the user interface device, on the responsive device, or on both the user interface device and the responsive device. In some implementations, such transformation may be performed by one or more processing devices that reside on a computing device separate from the user interface device and from the responsive device.

In any of the foregoing configurations, one kind of action that can be performed by a responsive device, and for which feedback can be provided, includes identifying a geographic location. This geographic location in turn can be used in many ways, examples of which include but are not limited to the following and can include combinations of two or more of the following. A geographic location can be used as an input to an application. A geographic location can be data communicated to another user or another machine. A geographic location can be treated as context information when selecting an action to be performed in combination with data based on the signals received from one or more user interface devices. A geographic location can be provided as feedback to a user.

Figure 3:
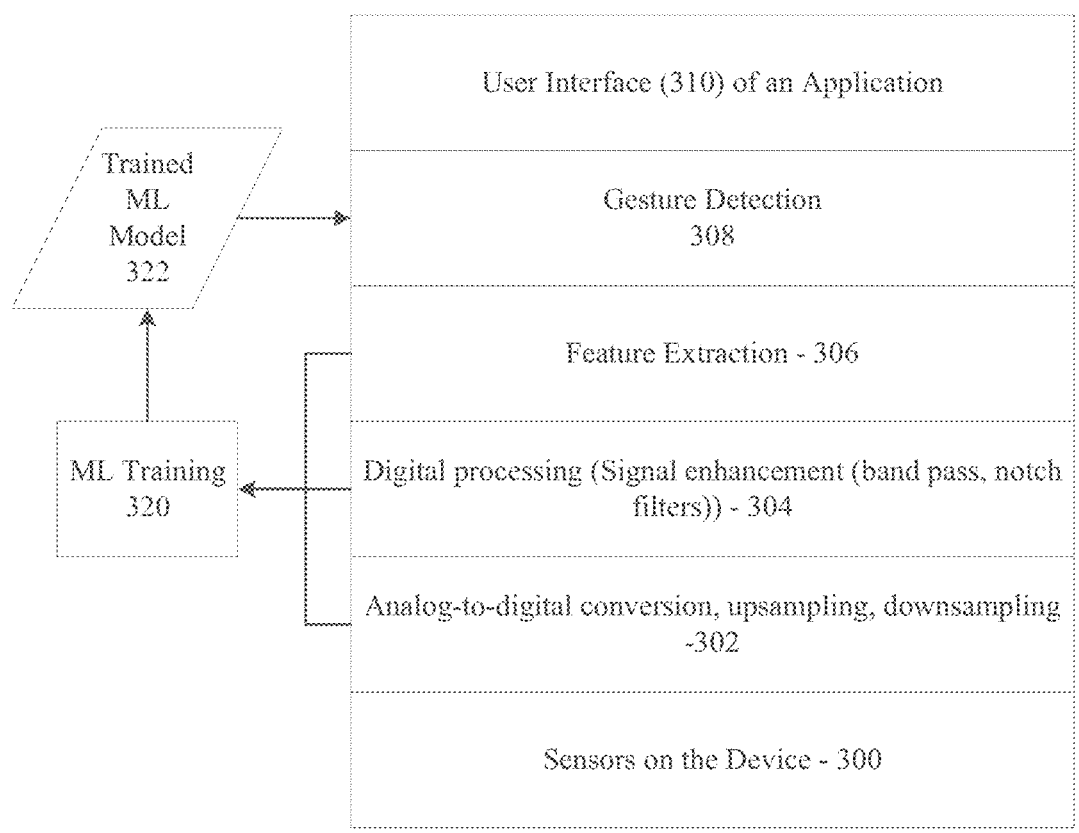
FIG. 3 is an illustrative schematic of processing stages of signals from the user interface device.

The transformation of the signals 102 and 104 from the sensors 106 and 108 into inputs to applications can involve several stages of processing. Referring now to FIG. 3, such stages of processing will now be described in further detail.

The first stage of processing is performed by sensors (300) in the user interface device. Some sensors output digital signals. Some sensors output analog signals. In some implementations, the biopotential sensor for a channel may include a dynamic impedance matching circuit and amplifier to output an analog differential signal. The output of this first stage is raw sensor signals.

The next stage 302 of processing can involve conditioning of the signals output from the sensors. After any conditioning, the signals output from the sensors are sampled and synchronized. For sensors that output analog signals, the analog signals may be subject to signal conditioning operations, such as filtering and amplification, performed by analog circuits. Analog signals are converted to digital signals using an analog-to-digital converter. For sensors that output digital signals, or for digital signals output from an analog-to-digital converter, the digital signals may be subject to signal conditioning operations, such as filtering and amplification, performed by digital circuits. Whether the conditioned signals are analog signals or digital signals, the signals from various sensors can be sampled at the same sampling rate to provide an output stream of digital sensor signals at the sampling rate, such that data from the various sensors are synchronized and at the same sampling rate. Such sampling can be performed by an analog-to-digital converter, or a digital-to-digital converter, and can include either upsampling, with or without interpolation, or downsampling, with or without filtering. The output stream of digital signals at the sampling rate from this second stage 302 is called herein "normalized digital sensor signals".

The normalized digital sensor signals can be subjected to some digital signal processing (304), for any filtering or other conditioning not applied prior to sampling which can be applied after sampling. For example, the biopotential signals can be filtered to remove or reduce the effects of electrical interference, by applying a notch filter. For example, the biopotential signals can be filtered to remove or reduce effects of other electrical activity affecting the body, to focus only on signals likely to be related to muscle movement, by applying a band pass filter. If the biopotential signals are to be processed with an emphasis on the nerve signals, then the biopotential signals can be filtered to remove or reduce the effects of signals associated with muscle activation, by using band pass filtering. Any other filtering or processing of signals derived from the outputs of any other sensors also can be performed in this digital signal processing stage 304. If used, the output of this third stage 304 is called herein "filtered" normalized digital sensor signals, which remains an output stream of digital signals at the sampling rate.

In the next stage 306, the optionally filtered, normalized digital sensor signals, are processed to extract "features" of the signals. In FIG. 3, this kind of processing is represented by a feature extraction layer 306. A feature is any characteristic of a signal that can be quantified by applying an operation to the signal, or to a transformation of the signal (e.g., a frequency domain representation of the signal), or to a combination of two or more signals or their transformations. Typically, given a signal that is an output stream of digital signals at the sampling rate, features are computed for a stream of subsets of the samples, called windows, by applying a window function. A window function can be specified by a moment in time in the stream of digital signals, and an interval. The result of applying the window function is that values are zero outside the interval. The simplest window function is a rectangular window which retains the original samples within the interval. It is possible to use window functions that apply a mathematical function other than the identity function to samples within the interval. For a sequence of windows of a stream of digital samples, another parameter is the amount of overlap from one window to the next, i.e., the amount of offset from the beginning of one window to the beginning of the immediately subsequent window. The offset can be the same as, less than, or greater than the interval specified for the window. The output of this fourth stage includes a stream of feature sets, with a feature set being output for each window of the (optionally filtered) normalized digital sensor signals. Several examples of features are described in more detail below.

In FIG. 3, a next stage 308 of processing is called a "gesture detection" layer. This stage involves processing the normalized digital sensor signals, filtered normalized digital sensor signals, or streams of feature sets extracted from them, to identify poses of a body part, location of a body part, or primitive gestures, or combinations or subsets of these, collectively called "gesture detection", in response to which the responsive device causes an action to be performed. Note that while FIG. 3 illustrates the feature extraction layer 306 between the gesture detection layer 304 and the digital signal processing layer 304, the gesture detection layer 308 can use, in some implementations, data output from the feature extraction layer, the digital signal processing layer, as well as the normalized digital sensor signals. In response to detection of a primitive gesture, the responsive device directs inputs, as indicated at 310, to the applications, in response to which applications perform operations.

As shown in FIG. 3, in some implementations, a pose, location, or primitive gesture can be detected using a computational model called a machine learning model. The machine learning model is a model trained by a machine learning process using labeled data, an example of which is described in more detail below. Typically, data from one or more user interface devices, such as normalized digital sensor signals, filtered normalized digital sensor signals, or streams of feature sets extracted from those signals, are collected in a manner that also labels the data as representing a known pose, location, or primitive gesture. A machine learning (ML) training module 320 receives the labeled data and generates parameters for a trained machine learning (ML) model 322. The ML training module 320 can process this data outside of the real-time interaction between a user interface device and a responsive device. The trained ML model 322 is provided to the gesture detection layer 308, typically by providing parameters of the trained ML model to the gesture detection layer 308, which applies the parameters within its implementation of the model. Thus, parameters for trained models are provided to a component within the user interface device or a component within the responsive device, such as the operating system, a device driver, or an application, which is responsible for performing gesture detection.

Having now described the interaction among various processing layers, some example implementations for these different layers will now be described.

At some times in these processing stages, information is transmitted between the user interface and the responsive device. This kind of processing can be considered a signal transmission layer (not shown in FIG. 3), but, depending on the implementation, the signals transmitted from the user interface device to the responsive device on the signal transmission layer may be the outputs of any of the layers 302, 304, 306, or 308. In other words, the user interface device can transmit normalized digital sensor signals, filtered normalized digital sensor signals, a stream of feature sets derived from those signals, or pose or location information derived from these, or primitive gestures detected based on such data, or any combination on these. A suitable design for any specific implementation depends on how much processing is to be performed within the user interface device before transmitting data to the responsive device, and the information to be used on the responsive device to perform any further processing, which depends on design constraints for the implementation.

Herein, this signal transmission layer is referred to as a device interface. The device interface includes a specification of the types and formats of information transmitted between the user interface device and the responsive device, a protocol of transmission of such information, and a communication system over which the information is transmitted. In some implementations, the user interface device implements a streaming data protocol to transmit a stream of digital samples based on the outputs of the biopotential and location sensors. The responsive device can send messages and feedback to the user interface device on the device interface. Thus, the device interface can be bidirectional. Alternatively, there may be a separate device feedback interface. Such a feedback interface may have its own specification of the types and formats of information transmitted between the responsive device and the user interface device, a protocol of transmission of such information, and a communication system over which the information is transmitted. In some implementations, the feedback interface is provided by asynchronous messaging. In some implementations, the communication system is a wireless Bluetooth connection between the user interface device and the responsive device.

At some times in these processing stages, information also may be communicated within the responsive device, from a first application (perhaps the operating system or a device driver for the user interface device) running on the responsive device to a second application running on the responsive device or on the machine associated with the responsive device. In some implementations, the first application includes the gesture detection layer, and the second application is designed to respond to outputs of the first application. In some implementations, the second application may have a set of expected inputs that can affect behavior of the application, and data received from the user interface device are mapped by the first application to these inputs. In some implementations, the first application does not perform gesture detection, but instead passes data, such as digital samples or a stream of feature sets, to the second application, and the second application performs gesture detection.

Herein, the application interface refers to the information communicated within the responsive device from the first application to the second application (or more generally, to an application running on the responsive device), and a protocol, including data format and messaging protocol, for such communication. Because there may be outputs generated by the second application, such as messages and feedback, to be sent by the responsive device to the user interface device, this application interface may be bidirectional. Alternatively, there may be a separate application feedback interface with its own data format and messaging protocol.

In some implementations, such as a device driver (a first application) for the user interface device running as part of an operating system on the responsive device, the first application can include both a device interface, to handle interaction with the user interface device, and an application interface, to handle interaction with the second application.

In some implementations, the first and second applications are combined into a single application, such that the single application implements a device interface, to handle interaction with the user interface device, and otherwise processes the information from the user interface directly without intervention by another application.

There may be several application interfaces providing multiple layers of processing. For example, a device driver (a first application) within an operating system may process data received from the user interface device into information about features detected, or poses detected, or location information, or primitive gestures detected; yet another application (the second application) may process such information further, such as to map such information into corresponding events to emulate another kind of input device, and provide such events to yet a third application.

Within this context, a user interface device 100 (FIG. 1A) generates location signals 102 and biopotential signals 104, and a responsive device 200 (FIGS. 2A-2D) receives data 202 based on these signals through a device interface. Within the responsive device, information based on the received data 202 can be passed to one or more applications through an application interface. The content of the data transmitted through the device interface and through the application interface depends on where the different stages of processing occur.

To reduce the amount of processing performed on the user interface device when the user interface device is battery-powered and wirelessly connected to communicate data to the responsive device, the user interface device can be configured to implement a device interface to transmit the normalized digital sensor signals. In this implementation, further processing of the data occurs on the responsive device.

In many computing devices that can be used to implement the responsive device, an operating system manages transfer of data from an input device, such as the user interface device, to an application, typically using a device driver. Some operating systems may allow data from an input device, such as the user interface device, to bypass the operating system and to be transferred directly to memory for an application. The device driver can implement both a device interface to communicate with the user interface device and an application interface to communicate with an application, and the application implements the application interface.

In implementations where the device interface provides the normalized digital sensor signals to the responsive device, a component on the responsive device processes these signals to generate inputs for applications. In some implementations, the device driver can pass received data through to the application, in which case the application implements the feature extraction and gesture detection layers. In some implementations, the device driver can implement the feature extraction layer, and the application can implement the gesture detection layer. In some implementations, the device driver can implement both the feature extraction and gesture detection layers. In some implementations, a first application implements part of the gesture detection layer, and passes processed information to a second application.

The pairing of such a user interface device with such a responsive device supports many different contexts in which a person is enabled to interact with a machine. Examples of such use contexts include, but are not limited to, any one or more of the following.

The combination of the responsive device and the user interface device may have a very small display or no display at all. The person may be unable to use a display. The person may be focusing on an object and cannot simultaneously look at the object and a display. The person may be grasping or holding another object. The person may be unable to provide touch input to a touchscreen or similar device. The person may need to keep hands free to hold an object and not a user interface device. The person may not be able to provide audible inputs. The person may be unable to provide speech input. The person may be unable to speak. It may be unsafe or undesirable for the person to speak or make noise in their current environment. The person may not be able to receive audible feedback. It may be unsafe or undesirable for the person to receive audible feedback in their current environment. The person may be physically constrained or impaired, or otherwise may have limited mobility. The person may be in a situation requiring limited perceptible activity, including motion or movement. In such context and in other contexts, the person may be attempting to communicate or interact with other individuals in similar contexts.

To support such user-machine interactions in such contexts, the responsive device is responsive to received data to perform operations based on the location signals and the biopotential signals generated on the user interface device (as a result of movement of the fingers and hands and motion of the wrist and arm, for example) and on user inputs to the user interface device, data received based on other sensors on the user interface device, and data about context from any source, and combinations of them. In turn, the person receives feedback through one or more of the user interface device, responsive device, machine, or other feedback device or combinations of them.

The operation to be performed also can be based on information from any other sensors on the user interface device or based on other contextual information available to one or more of the user interface device, the responsive device, or the machine. Examples of further contextual information that can be used to perform an operation include but are not limited to the following and combinations of the following. Information from a user interface device worn by another person can be used. Information from a sensor from another device, such global positioning information from a device associated with a person, can be used. Information accessed from a local or remote database can be used.

More particularly, primitive gestures are detected as occurring at moments in time based on the location signals and the biopotential signals. In some cases, the operation to be performed is selected based on occurrence of a primitive gesture. In some cases, the operation to be performed is selected based on occurrence of a plurality of primitive gestures in a sequence. In some cases, the operation to be performed is selected based on co-occurrence of two or more primitive gestures. In some cases, the operation to be performed is selected based on the context or contexts of such occurrences. Combinations of these bases for the operation to be performed are also possible.

To illustrate kinds of primitive gestures that can be detected based on the biopotential signals and the location signals, the following description is based on an example of a user interface device worn on the person's wrist.

A primitive gesture may be characterized, as described in more detail below in connection with FIG. 4A, as a sequence of a first pose of the hand, or a first location of the wrist, or both, at a first moment in time; and a second pose of the hand, or a second location of the wrist, or both, at a second moment in time following the first moment in time. In some primitive gestures, such as a hold, the first and second location are the same. A primitive gesture also can be considered detecting such a transition, or absence of a transition.

A primitive gesture may be characterized by a set of features extracted from the location signals, or a set of features extracted from the biopotential signals, or both, which differentiates that primitive gesture from other primitive gestures. The set(s) of features may be extracted from a single window of samples of the signal, or a sequence of successive windows of samples of the signals. In some implementations, the sets of feature(s) which characterize a primitive gesture correspond to one or more poses of the hand, or location or locations of the wrist, or combinations of these.

A primitive gesture may be characterized by one or more states, as described in more detail below in connection with FIG. 4C: an initial state of a signal in a window just prior to the primitive gesture occurring (a first set of features); an onset indicating a change in a signal in a window occurring at a beginning of an occurrence of the primitive gesture (a second set of features); the states of or changes in a signal in one or more windows immediately after the onset (a third set of features); and a change in a signal in a window at the end of the primitive gesture (a fourth set of features). A primitive gesture may have a moment in time at which the primitive gesture is considered detected. A primitive gesture may be present for a duration of time, and thus may have a moment in time at which the primitive gesture begins and a moment in time at which the primitive gesture ends.

Because the output of the biopotential sensor (106 in FIG. 1A), when located at the top of the wrist, is related to activity of muscles that control the hand and fingers, the biopotential signal is an important source of information about the pose of the hand. However, if the location, i.e., position or orientation, of the top of the wrist is changing due to arm motion, such arm motion can cause the electrodes of the biopotential sensor to have inconsistent degrees of contact and locations of contact with the skin, in turn causing inconsistent generation of the biopotential signals. Thus, the arm motion can reduce the ability to detect the pose of the hand from the biopotential signals when the arm is in motion. In such applications where this inconsistency occurs, data based on the biopotential signals can be ignored while significant arm motion is detected. Herein, this operation of ignoring biopotential signals is called "motion silencing". Thus, in some implementations, to detect a primitive gesture that is based on a pose of a hand, an initial state of a signal in a first window, just prior to a second window in which the pose can be detected, can be the absence of significant changes in the location of the wrist. In the absence of significant changes in the location of the wrist, the biopotential signals are analyzed to detect a pose of the hand.

While there many possible poses of the hand that can be detected, herein are described several poses that relate to lifting one or more fingers. Motions of a finger can involved extension or contraction or both. Differences in biopotential signals generated for different primitive gestures of a finger can be used to differentiate the different primitive gestures. By processing the biopotential signals for indications of poses that relate to lifting one or more fingers, very slight finger movements can be detected where those finger movements can be performed while holding an object or while the hand is hidden, such as in a person's pocket.

Figure 4A:
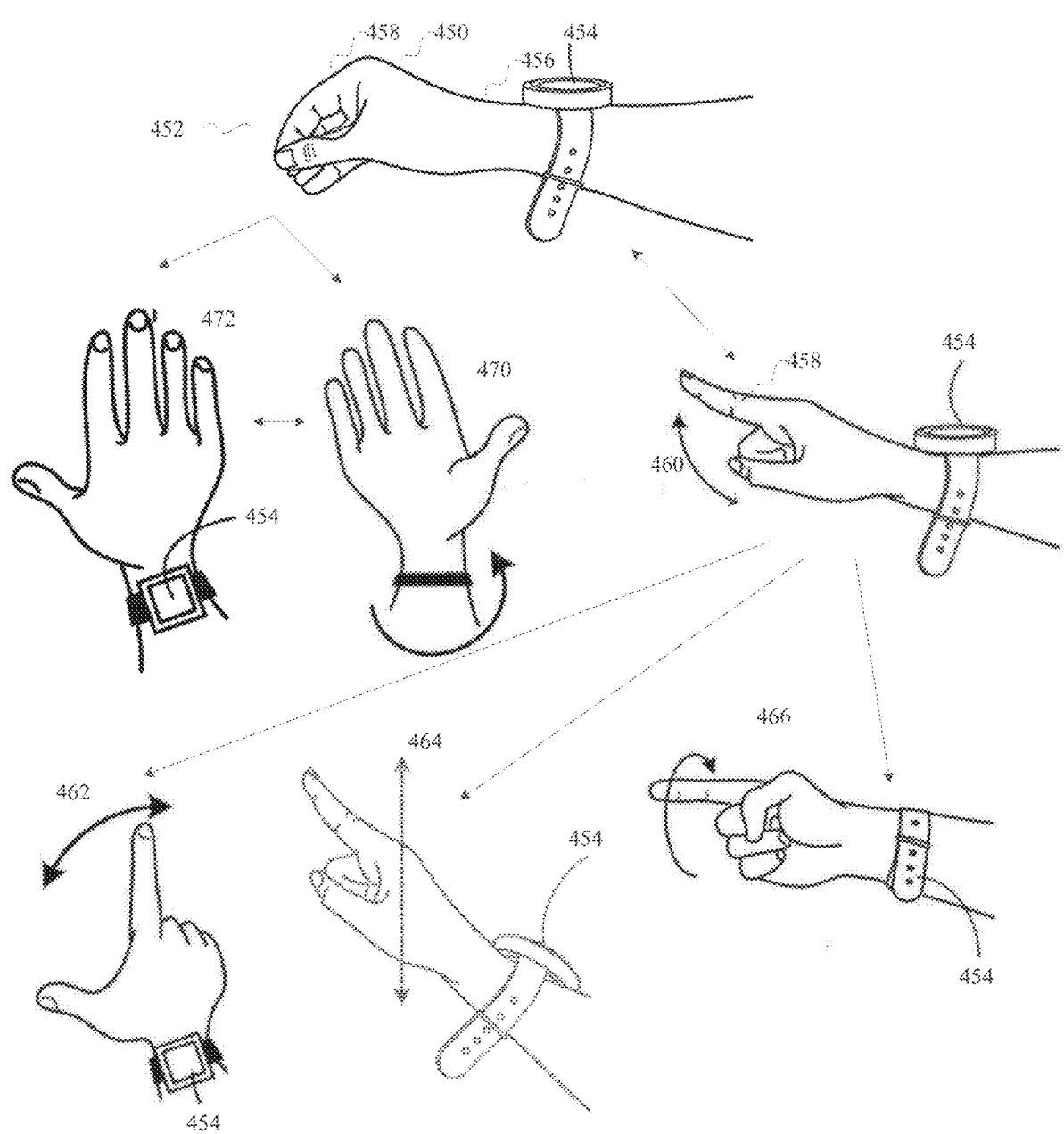
FIG. 4A illustrates example hand poses.

Referring to FIG. 4A, a hand 450 is shown in a neutral position 452. A user interface device 454 is shown as worn near the top of the wrist 456. When a finger is lifted, as shown at 460, from this neutral position 452, the first joint 458 closest to the hand is rotated toward the back of the hand and away from the palm, in contrast to contracting the finger towards the palm. Such movement also is distinct from a flick or a point in which the finger is extended or made straight without rotation of the first joint toward the back of the hand. Any finger, or multiple fingers in sequence or together, can be lifted. Lifting a finger also can be understood as an action that lifts a finger away from a surface, such as a table top or object being held, while the palm of the hand is resting on that surface. While the hand remains in position, the finger is lifted away from the surface. The "onset" or second set of features characterizing this movement is a sudden increase in amplitude in the channels of the biopotential signal. Differences among the channels of the biopotential signals allow lifting of the one finger, such as the index finger, to be distinguished from lifting of other fingers.

A primitive gesture called a "lift" herein occurs when the finger is lifted (460) for a short period of time, which can be defined by a fixed or adjustable threshold, and then returns to a resting state (e.g., 452) in which the biopotential signals no longer indicate that the finger is lifted. Thus, the state of or change in the signals in one or more windows immediately after the onset (the third set of features) is a sudden drop in the biopotential signals related to the lifted finger. The lift can be considered detected upon detection of a small number of windows of elevated amplitude in the biopotential signal related to the lifted finger pose, followed by a number of windows for which the biopotential signal related to the lifted finger drops significantly. The lift can be considered ended when detected and thus does not involve detection of a fourth set of features to consider the lift ended.

A primitive gesture called a "hold" herein occurs when the finger is lifted (460) and held for a period of time in that pose (460). The period of time defining a lift versus a hold can be a fixed or adjustable threshold. Thus, the state of or change in the signals in one or more windows immediately after the onset (the third set of features) is a continued elevated amplitude in the biopotential signals related to the lifted finger, without further substantial wrist motion. The hold can be considered detected upon detection of two or more windows of elevated amplitude in the biopotential signal related to the lifted finger. The hold can be considered ended when the biopotential signal related to the lifted finger drops significantly, which represents the fourth set of features defining the hold.

A primitive gesture called a "finger swipe" herein occurs when a finger is lifted (460) and in the "hold" pose (460), and then the arm is moved such that the location of the wrist changes with a sweeping motion in a direction, such as to the right or to the left as shown at 462, or up or down as shown at 464. Thus, the state of or change in the signals in one or more windows immediately after the onset (the third set of features) is a change in the location of the wrist, in an amount over a threshold, in a given direction. The figure swipe can be considered detected upon detection of the wrist motion after detection of the lift and hold poses, without involving detection of a fourth set of features to consider the finger swipe ended. A primitive gesture similar to a finger swipe is a combination of a lift and hold pose followed by a rotation of the top of the wrist in a clockwise or counterclockwise direction as shown at 466.

A primitive gesture called an "analog lift" herein occurs when a finger is slowly lifted from an initial pose 452 to the lifted pose 454 over a period of time. The amplitude of the biopotential signal typically is elevated for an analog lift, in comparison to a lack of movement, yet is initially lower than when the biopotential signal indicates a lift, but also gradually increases over a period of time. Thus, the state of or change in the signals in one or more windows immediately after the onset (the third set of features) is a continued increase in the biopotential signal related to the lifted finger. The analog lift can be considered detected upon detection of two or more windows of successive change, whether increase or decrease, in the biopotential signal related to the lifted finger. The analog lift can be considered ended when the biopotential signal related to the lifted finger returns to its initial state, which represents the fourth set of features defining the analog lift. The analog lift can thus be used as an input to slowly increase or decrease a value while the analog lift continues over the period of time.

Because the output of the location sensor (108 in FIG. 1A), when located at the top of the wrist, is related to location of the wrist, the location signal can be a primary source of information about position, orientation, and any changes in these, of the top of the wrist. It is possible to distinguish, using the location signal, different positions, orientations, and motion of the top of the wrist. The locations and changes of location of the wrist can be interpreted as a variety of primitive gestures.

Two illustrative examples of primitive gestures based on location will now be described: relative location and rotations. A relative location can be based on position along one or more axes. In the examples below, relative locations are defined with reference to a grid of two or more elements in one or two or three dimensions to which position is mapped. In the examples below, a grid is described has having three vertical elements and three horizontal elements. Similarly, rotation can be based on orientation. In the example below, rotations are expressed as a degree of rotation of the wrist with respect to the elbow in two or more subdivisions of 180 degrees. In the examples below, the subdivisions are described as a positive or negative N-degree rotation (from +90 to −90 degrees). A variety of other primitive gestures primarily related to location can be defined based on the location signal, whether alone or in combination with other signals.

An orientation, or rotation, of the wrist and hand with respect to the elbow can be detected, for example based on "roll" detected by a gyroscopic sensor located at the wrist. For example, as shown in FIG. 4A, the wrist may be in a "neutral" position 452, or in a 90 degree clockwise rotation, or "palm up" position 470, or in a 90 degree counterclockwise rotation, or "palm down" position 472, or can be in the process of being rotated from one orientation to another. The use of three different relative rotational locations (orientations) is merely illustrative; any number of different relative rotational locations can be used depending on granularity and reliability of detection of the rotation. The amount of rotation can be represented by a N-degree rotation.

The orientation of the hand with respect to the wrist also may be detected (the amount of bend of the hand with respect to the forearm at the wrist). For example, the hand orientation can in an "up" position, "down" position, or "neutral" position with respect to the wrist. The use of three different relative orientations is merely illustrative; any number of different relative orientations can be used depending on granularity and reliability of detection of the orientation. The orientation can be represented by, for example, a N-degree offset from neutral, or a classification of the direction, or a direction. Rotation of the hand to the left or right with respect to the wrist also may be detected.

A relative vertical location can be detected based on location at the beginning of, end of, or during vertical motion of the arm, such as by lifting or lowering of the arm. For example, as shown in FIG. 4B, the wrist may be "high" or "up", such as above the shoulder at 480; "low" or "down", such as below the hips at 482; or "medium" or "neutral", such as between the hips and shoulders at 484, or can be in the process of moving from one location to another. Using the shoulders and hips as thresholds are merely illustrative; other threshold heights or reference points can be used. For example, one may determine the height of the wrist with respect to the elbow instead of the shoulder. Also, the use of three different relative heights is merely illustrative; any number of different relative vertical locations can be used depending on granularity and reliability of detection of the location. The direction can be represented by a radial direction with respect to an anchor point, such as the elbow or waist or hips. The information can be provided as an angle, which can be representative of an arm angle when the user interface device is worn on the arm.

A relative horizontal location similarly can be detected based on location at the beginning of, end of, or during horizontal motion of the arm, such as by sweeping the arm left or right. For example, the wrist may be to the wearer's "left", "middle", or "right", or can be in the process of moving from one such location to another. The use of three different relative horizontal locations is merely illustrative; any number of different relative horizontal locations can be used depending on granularity and reliability of detection of the location. The direction can be represented by a radial direction with respect to an anchor point, such as the elbow or spine. In some implementations, the horizontal direction can be provided for example by a geomagnetic sensor. In some implementations, the horizontal direction can be derived from accelerometer or gyroscopic data from an initial reference position.

Figure 6:
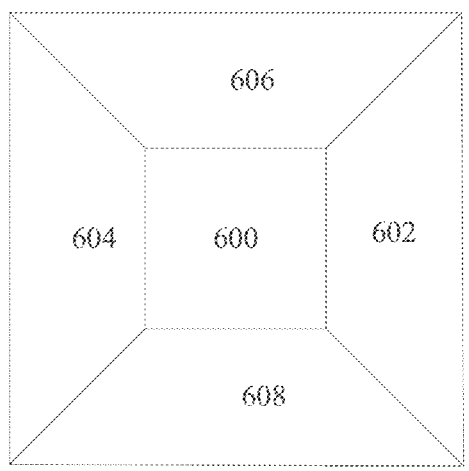
FIG. 6 is a schematic diagram of how an application can select different operations based on the location of the wrist.
Figure 8:
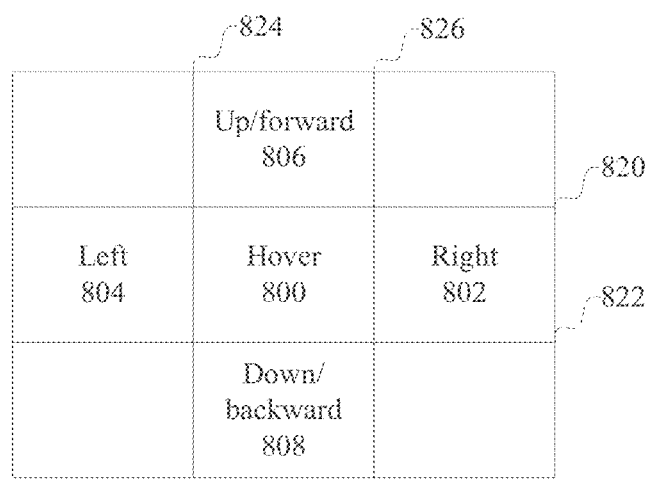
FIG. 8 illustrates graphically how location of the wrist can be mapped to different operations.

An application can include a graphical user interface that allows a user to change the definitions of relative locations. For example, a grid with a number of grid elements can be defined based on thresholds used to define relative vertical and horizontal locations. A graphical user interface can present a graphical representation of this grid to the user. The user can manipulate the number and sizes of grid elements that define relative horizontal or vertical locations. For example, as shown in FIGS. 6 and 8 (described in more detail below), if displayed on a touchscreen or other conventional graphical user interface allowing selection of displayed objects, lines defining a grid can be selected and moved by the user. In response to a user selection, the application on the responsive device updates the dimensions of the grid elements. The updated grid elements can be displayed interactively during this operation. When complete, the updated grid elements can be used to process the wrist location information into the relative vertical and horizontal location.

As indicated above, other primitive gestures that can be detected are based on one or more poses or locations being detected at a moment in time, or in a sequence over time, or as co-occurring at a moment in time. One kind of primitive gesture that is particularly useful is a primitive gesture intended to cause the responsive device to start processing signals from the user interface device, or from another input device or sensor, or both. Such a primitive gesture is herein called a "wake word". In some implementations, prior to processing signals from the user interface device, the user interface device can be set in a state in which it is not transmitting data from sensors other than the sensor(s) that provide(s) signals from which the primitive gestures defining the wake word are detected. The wake word can be used to "unlock" the user interface device and start processing data received from the user interface device. Similarly, the same wake word, or another primitive gesture (a "sleep word"), can be used to "lock" the user interface device and stop processing data received from it. Such a wake word or sleep word can control processing performed by the responsive device, or can be specific to an application running on the responsive device, or both.

The wake word or the sleep word can be any sequence of primitive gestures that can be detected from the sensors that are actively monitored. Ideally, the sequence of primitive gestures defining the wake word are unlikely to naturally occur from ordinary motion of the wrist or arm or movements of the hand or fingers; instead this sequence of primitive gestures should be likely to occur only intentionally by the person. As an example, rotating the wrist in a sequence of specific N-degree rotations (described below) can be used as a wake word.

In some implementations, the sequence of primitive gestures defining the wake word or the sleep word can be processed by a low-level driver of the operating system of the responsive device as a signal to activate or deactivate the responsive device's processing of data received from the user interface device, or from another sensor or input device. In some implementations, the sequence of primitive gestures defining the wake word or the sleep word can be processed by an application as a signal to activate or deactivate the application's processing of inputs based on the responsive device processing the data received from the user interface device. In some implementations, the sequence of primitive gestures defining the wake word or the sleep word can be processed on the user interface device to activate or deactivate transmission of data from the user interface device to the responsive device. In such an implementation, the responsive device may be configured to continually process data received from the user interface device. In some implementations, the wake word or sleep word can activate processing of another form of input device or sensor data, such as to activate voice recognition applied to audio signals received from a microphone on the user interface device, responsive device, or other device.

Where a wake word or a sleep word for unlocking and locking the user interface device both are processed by a low level device driver for the operating system of the responsive device, in some implementations, the responsive device can receive signals from the user interface device through an input port of the responsive device. A device driver for that input port can process the received signals to determine whether an unlock command or a lock command has been received. In response to the unlock command being received, subsequent data can be passed to the operating system of the responsive device for further processing by the operating system or other applications managed by the operating system. Similarly, in response to the lock command being received, the device driver can stop passing data from the user interface device to the operating system of the responsive device.

Figure 4C:
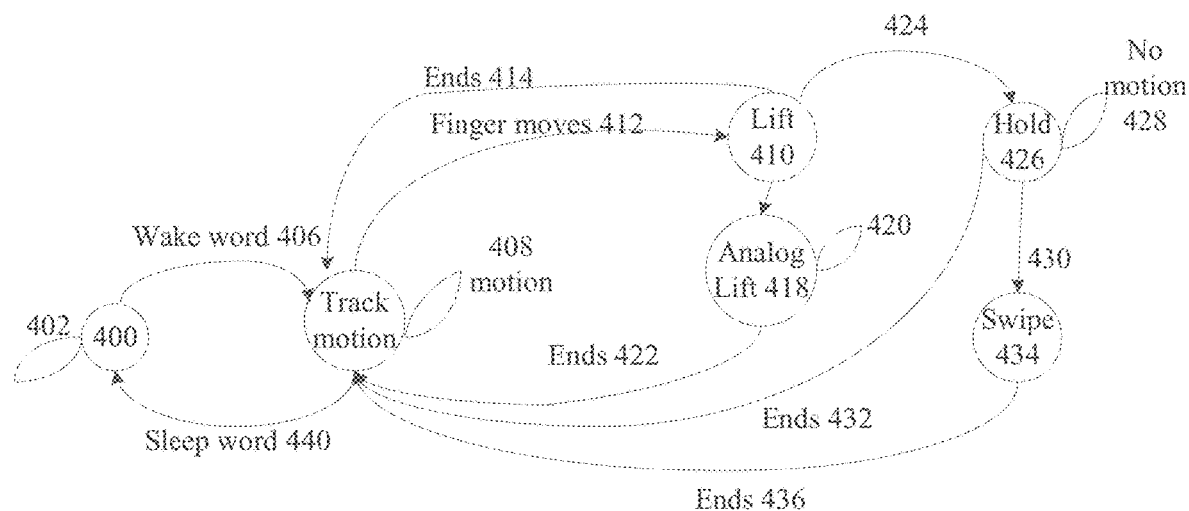
FIG. 4C is a state diagram illustrating processing of data received from the user interface device.

Referring now to FIG. 4C, a state diagram is used to illustrate the operation of detecting primitive gestures. Typically, the data to be processed is in the form of a sequence of digital samples having an amplitude for each sample and a sampling rate. The system defines a sequence of "windows" of samples. A window of samples can be specified by a. a moment in time in the signal and b. a period of time or number of samples around that moment in time. For each window, features are calculated based on the samples in that window, using digital signal processing techniques. For each window, the sampled data and any features extracted from the sampled data in that window, are processed to determine if features related to a primitive gesture have been detected in that window. Any given window, or a collection of windows, can be labeled as representing a primitive gesture or not representing a primitive gesture. Information about features detected in previously processed windows can be used to determine if a primitive gesture has been detected in a current window. More details about how windows can be processed are provided below. Processing the received data as windows of samples and corresponding features allows a state-based and sequential approach to processing the received data to detect occurrence of primitive gestures, combinations of primitive gestures, and sequences of primitive gestures. An example implementation of this state-based processing is in FIG. 4C.

Processing begins in an initial state 400 prior to any wake word having been received from the user interface device. In response to data other than the wake word, as indicated at 402, processing remains in this initial state 400. In response to detecting a wake word, processing transitions to state 404, as indicated at 406. A wake word received in this state can be used to transition 440 back to the initial state 400.

Within state 404, processing primarily monitors the information from the location sensor on the wrist. So long as the information from the location sensor on the wrist indicates substantial motion, processing remains in this state 404, as indicated at 408, effectively implementing motion silencing. While in this state, information about the position and orientation of the wrist can be updated based on the information from the location sensor. If there is no substantial motion of the wrist, the information from the biopotential sensor can be analyzed to determine if there is any indication of movement of the hand or fingers, such as a finger lift. In a finger lift is detected, a transition to a lift state 410 occurs, as indicated at 412. Similar states could be provided for detection of other features related to other movements.

In the lift state 410, processing determines whether the detected movement indicates a lift, an analog lift, or a hold, and which of those is indicated, by analyzing the subsequently received data. If the detected movement indicates a lift, an operation can be performed in response to the lift and a transition 414 back to state 404 can occur. As an example, the operation performed can be based on the current position and orientation of the wrist at the time the lift was detected.

If the detected movement indicates an analog lift, a transition 416 to an analog lift state 418 occurs. In this state, an operation responsive to the analog lift can occur while the analog lift continues to be detected, as indicated at 420. The operation performed can be based on the current position and orientation of the wrist at the time the analog lift was detected. When the analog lift ends, a transition 422 back to state 404 can occur.

If the detected movement indicates a hold (the biopotential sensor detects a continued level of activation of the finger muscle), a transition 424 to a hold state 426 occurs. In this state, an operation responsive to the hold can occur while the hold continues to be detected and there is no motion of the wrist detected, as indicated at 428. When the hold ceases to be detected, a transition 432 back to state 404 can occur. If motion of the wrist is detected while the hold also continues to be detected, a transition 430 occurs to, and a finger swipe is indicated as detected in, state 434 and a corresponding operation can be performed. After the operation related to the finger swipe is performed, a transition 436 back to state 404 can occur. The operation performed in state 428 or 434 can be based on the current position and orientation of the wrist at the time the hold or finger swipe was detected.

Figure 5:
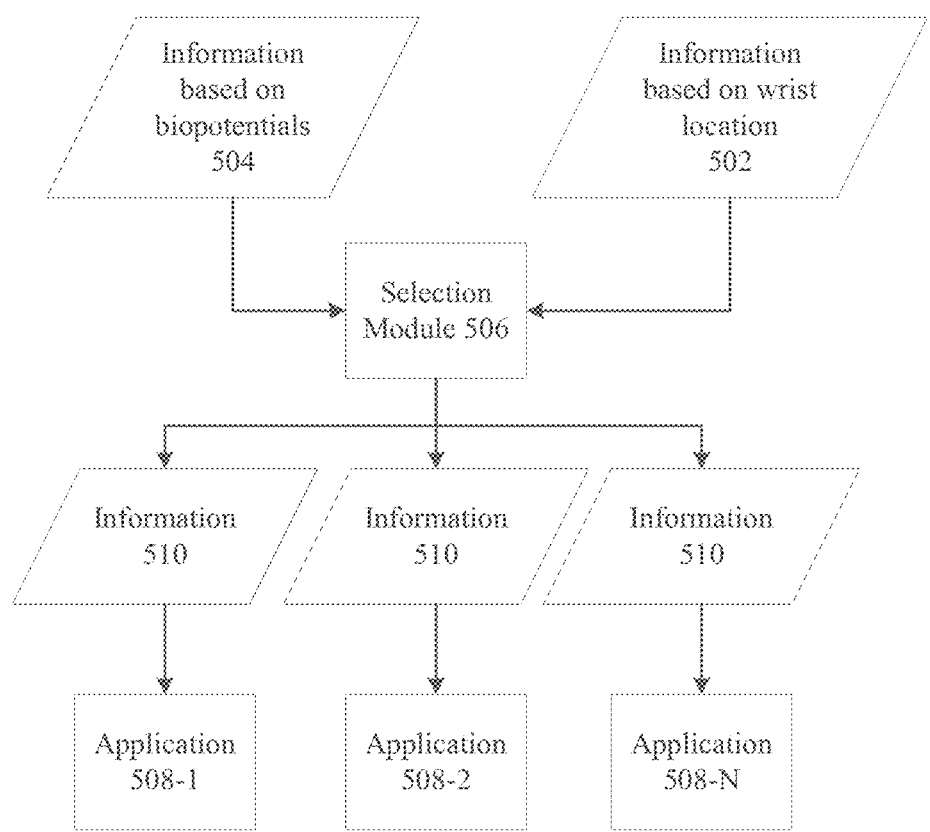
FIG. 5 is a data flow diagram illustrating interaction between the user interface device and the responsive device to provide inputs to applications on the responsive device.

Referring now to FIG. 5, a data flow diagram illustrating behavior of the responsive device (200 in FIGS. 2A-2D), in response to data (202) received based on signals from the sensors of the user interface device (100 in FIG. 1A), to provide inputs to applications, will now be described. The responsive device, after being activated to receive and process information from the user interface device, can perform operations based on information 502, which is derived from location of the wrist as detected by the location sensor, and based on information 504, which is derived from biopotentials related to muscle movement as detected by the biopotential sensor, and combinations of the two. The information 502 and 504 can be any of the digital samples, features, pose, location, or detected primitive gestures and state information produced by any of the layers of processing of data from the user interface device, along with any other available context information. In some implementations, the responsive device can include a selection module 706 which can select an application (508-1, 508-2, . . . , 508-N). Within an application (508-1, 508-2, . . . , 508-N), the application performs an action based on the information 510, which can include the information 502 or 504 and any additional information derived from these by the responsive device or the application.

An application can select an operation based on one or more of the detected location of the wrist or the detected pose of the hand, or combination of these. In some implementations, the responsive device can associate actions with locations of the wrist, and those actions can be activated in response to a pose of the hand being detected while the wrist is in a given location. As described above, settings that define thresholds for determining relative wrist locations can be manipulated in a graphical user interface. Such settings also can include associating, with a location, one or more actions with a pose or other primitive gesture that may occur while the wrist is in the location.

Several additional examples will now be described to further illustrate this kind of behavior by the responsive device.

First Example

In one example implementation different applications are assigned to different locations of the wrist with respect to the body. For example, a first application can be assigned to an "up" position, a second application can be assigned to a "down" position, and a third application can be assigned to a "neutral" position. The responsive device, while it has determined that the user interface device is in the up position, directs inputs to the first application. The responsive device, while it has determined that the user interface device is in the down position, directs inputs to the second application. The responsive device, while it has determined that the user interface device is in the neutral position, directs inputs to the third application.

The inputs directed to the applications can be, for example, based on one or more primitive gestures detected while the user interface device is in the given position. For example, the user may perform a lift with the index finger while the user interface device is in the up position. An input based on this primitive gesture is then passed to the first application. As another example, the user may perform an N-degree wrist rotation while the user interface device is in the down position. An input based on this primitive gesture is then passed to the second application. As another example, the user may perform an N-degree wrist rotation followed by a lift with the index finger while the user interface device is in the neutral position. An input based on this sequence of primitive gestures is passed to the third application.

As a specific illustrative use case, a person may be walking while carrying a mobile computing device (a responsive device), such as a cellular phone, while wearing a wristband (a user interface device) with an inertial measurement unit and biopotential sensors. The mobile computing device may be in the person's pocket, or held in the person's hand, or may be wrist-worn, or elsewhere on the person's body. The mobile computing device and the user interface device may be combined in the same device. The mobile computing device may have a display, but this display may or may not be visible to the person. The mobile computing device typically has an operating system, such as the iOS operating system or Android operating system, and can be running one or more applications. For example, a first application can be a weather application, a second application can be a music playback application, and a third application can be a map application. The person may be wearing headphones that communicate with the mobile computing device, or the mobile computing device may have a speaker, to playback audio under the direction and control of the mobile computing device.

Using this example setup, the person may raise her hand above the head, and then perform an index lift. In this case, the mobile computing device directs the index lift to the weather application, which in turn may cause the mobile computing device, for example, to play audio through the headphones using is a speech-generated version or recording of a current weather forecast.

The person may have her arm, wrist, and hand in the neutral position, and perform an index finger lift. In this case, the mobile computing device directs the index lift to the audio playback application, which in turn may cause the audio playback application to begin playing back music. The current music selection to be played back may be determined by various default settings. After playback begins, the audio playback application can be attentive to further inputs, which would provide various playback controls (see the second example below).

The person may lower her hand below her waist or hips, to a low position, and perform an index finger lift. In this case, the mobile computing device directs the index lift to the map application, which in turn may cause the mobile computing device to, for example, play audio through the headphones using a speech-generated version or recording of a description of the user's current location on the map.

In this example implementation, the operating system of, or a control application running on, the mobile computing device can include the selection module 506 in FIG. 5. The selection module can include a mapping of detected wrist locations to applications. For example, the selection module can maintain a data structure, such as a table, that stores data representing a relationship of a detected wrist location to a corresponding application. In response to receiving data indicating a detected wrist location from the user interface device, the operating system or a control application can select the application corresponding to that wrist location as the target of any action associated with a detected primitive gesture based on the data received from the user interface device.

Second Example

As another example implementation, consider an application in which multiple functions can be selected, such as an audio playback application. Illustrative examples of audio playback operations include play, stop, pause, skip forward, skip backward, select a playlist, select an item in a playlist and so on.

In this example implementation, different operations can be assigned to different elements in an M×N grid, with a minimum size grid of 1×2 or 2×1, i.e., a minimum of two grid elements. The grid can be rectangular, with grid elements within the grid can be rectangular, uniform, and adjacent. The grid elements can be non-rectangular. The grid elements can be non-uniform. The grid elements can be non-adjacent. The grid elements may have different shapes and sizes. The grid elements can be arranged in two dimensions or three dimensions. The grid elements' shapes and sizes can be user-defined and user-modifiable, or can be defined by the computer system and can be fixed, or a combination of the two. Each element in the grid can be assigned to one or more operations to be performed. The application can include multiple grids, where in response to a primitive gesture occurring while one grid is active, results in the application activating another grid for processing further primitive gestures.

Given a currently active application and a currently active set of operations, the detected location of the wrist, optionally in combination with one or more detected poses or primitive gestures, can be passed to the currently active application. The currently active application in turn performs one or more operations based on at least the detected location of the wrist. The application uses the detected location to select a grid element of the currently active grid, and then performs an operation associated with that grid element. The operation performed may depend on a detected pose or primitive gesture.

The grid representing the set of operations and its mapping to detected locations may be invisible to the user. However, although not visible to the user, the grid or grids are conceptually or virtually known or understood by the user so that the user can select locations that the user knows will be interpreted as associated with corresponding ones of the elements of the grid. In some applications the grid may be visible on a display.

As a specific illustrative use case, consider an audio playback application for which various operations are provided, such as start, stop, and pause playback, skip forward, skip backward, volume up, and volume down. Referring to FIG. 6, an example grid representing a conceptual spatial mapping of the operations to locations is shown. In this example, start, stop, and pause are mapped to a center region 600. Skip forward is mapped to a region 602 to the right; skip backward is mapped to a region 604 to the left. Volume up is mapped to a region 606 at the top; volume down is mapped to a region 608 at the bottom. This mapping of operations to locations can be explained to the user in some manner so that the user can understand conceptually where the different regions are located, and the operations associated with them. On a device with a display, a visualization of this mapping can be presented on the display.

While the audio application is the active application for receiving inputs, the responsive device can provide inputs to the audio application based on detected primitive gestures. In one example implementation, an input can activate a spatial (virtual or "real") menu, such as in FIG. 6, in response to a primitive gesture being detected. While the index finger is lifted, motion of the wrist (i.e., performing a finger swipe) allows other operations to be performed. For example, a finger swipe to the right or left allows the skip forward or skip backward operations to be selected. A finger swipe up or down allows the volume up or volume down operations to be selected. Rotation of the wrist, by rotating the forearm about the elbow, can be used to provide additional input. The processing of operations with respect to motion of the wrist can end when the user stops holding the index finger in the lifted position.

As an example, a user can have the wrist at a neutral position with respect to the body, perform an index finger lift, hold the index finger in the lifted position while moving the wrist to the right, and then release the index finger lift. In response to this combination of wrist locations and poses of the hand, the responsive device directs the wrist location and pose information to the audio application. In turn, the audio application activates the grid 800, and processes the wrist location and pose information as an instruction from the user to skip to a next song on a playlist. The audio application begins play back of the next song in the playlist. After user stops lifting the index finger, the audio application stops processing inputs with respect to the grid and continues playing back the selected song. As another example, an analog lift can be used to gradually increase or decrease volume of sound being played on a device.

Figure 7:
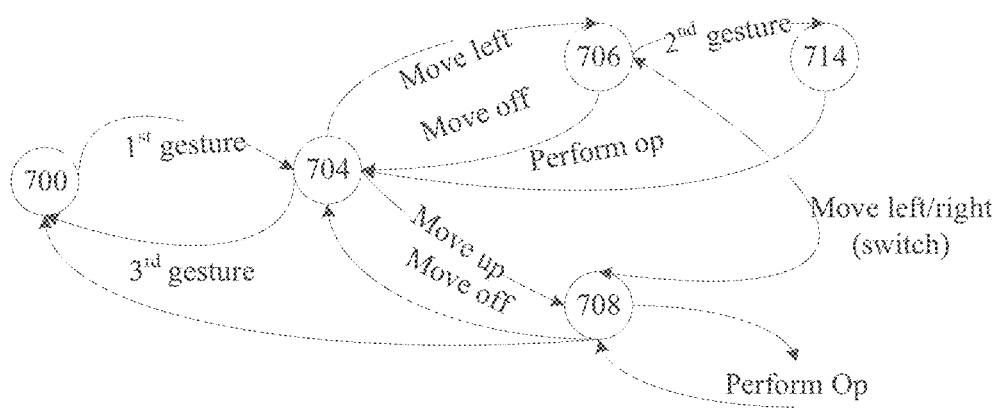
FIG. 7 is a state diagram of how an application can perform different operations based on a pose of the hand or a location of the wrist or both.

An application can maintain state information based on the information received based on the user interface device. Referring now to FIG. 7, the application can be in a first listening state 700, in which a first primitive gesture, such as an index finger lift and hold, can activate monitoring for further inputs related to multiple grid elements of a first grid. The first primitive gesture invokes a transition 702 to a second state 704. Motion of the wrist detected after that first primitive gesture, in this second state, can be used to determine a spatial position, which in turn is mapped to one or more grid elements, called the selected grid element. A particular state (e.g., 706, 708) can be assigned for each grid element. In some implementations, while the wrist remains in a spatial position corresponding to the selected grid element, e.g., in state 708, an operation related to the selected grid element can be performed, as indicated at 710, such as increasing the volume. The application can remain in this state until the user moves the wrist location to be no longer on this grid element, or until the grid or application is no longer activated.

In some implementations, while the wrist is in a spatial position corresponding to the selected grid element, e.g., in state 706, an operation related to the selected grid element can be processed after yet another, second primitive gesture occurs as indicated by transition 712 to state 714. Thus, the application can be placed in state 714 by the user placing the wrist at a neutral vertical location (corresponding to the audio application which is in state 700), performing an index finger lift (activating the grid of commands and transitioning to state 704), swiping the wrist up (causing a transition to state 706), and then performing another action, such as an N-degree rotation, (causing the transition to state 714). After processing the operation for this other state 714, a transition to another state can occur, such as a transition to state 704 or 700.

Motion of the wrist while the index finger is lifted can cause the application to switch its selection among the different grid elements, by switching between states, for example between states 706 and 708. For example, after a user initially moves the wrist to the right and the application initially selects the grid element to the right, a user may move the wrist to the left, causing the application to select a grid element to the left. A third primitive gesture, such as ending an index finger lift and hold, can terminate the processing of motion information for the wrist in connection with the spatial elements, causing a transition back to the initial state 700.

Third Example

As another illustrative use case, consider a controller for a miniature, unmanned, airborne vehicle, i.e., drone, which has a controller responsive to commands received wirelessly over radio frequencies to control the motion of the vehicle. For such a vehicle, various control operations can be provided for controlling motion, such as to direct it to move up or down, hover, rotate left or right, or move forward or backward, or some combination of these. Such control is typically referred to as "low-level" control. A wake word can be used to initiate such low level control through the user interface device.

Referring to FIG. 8, an example grid representing a spatial mapping of wrist locations to operations is shown. In this example, the absence of wrist motion is mapped to a hover operation, as indicated at a center region 800. Motion of the wrist to the right, mapped to a region 802 on the middle right, is mapped to moving the drone to the right. Motion of the wrist to the left, mapped to a region 804 on the middle left, is mapped to moving the drone to the left. Motion of the wrist up, mapped to a region 806 in the top center, is mapped to moving the drone up or forward. Motion of the wrist down, mapped to a region 808 in the bottom center, is mapped to moving the drone down or backward. The distinction between up/forward or down/backward can be implemented based on detected movement of the finger. For example, a hold in combination with an up or down wrist location can signal moving the drone up or down; whereas, the absence of a hold can cause the drone to move forward or backward. The upper left and right, and lower left and right corners can indicate a combined motion of the wrist, or can be mapped to another command Wrist N-degree rotations (not shown in FIG. 8) clockwise or counterclockwise also are wrist motions that can be mapped to corresponding rotations of the drone in a corresponding direction and amount.

Examples Using Geographic Location

In some implementations, a responsive device can use information based on the data received from one or more user interface devices to determine a geographic location. In some implementations, the determination is assisted using additional sensor information or additional context information, or both, received from one or more other user interface devices, or one or more other sensors, or other source of information, or any combination of these.

Some example scenarios in which geographic location can be determined include, but are not limited to, the following.

An individual may be pointing in a specific direction, such as north, or south, and may want information about what is in that general direction. An individual may point at a street corner or a building and may want information about it, or simply to identify it. An individual may point in a direction and intend to set a point on a map. For example, an individual may point at their feet to set the point on the map or to communicate their location to another device. An individual may point in a direction to identify an object, such as to spot a deer or other animal while hunting, or for communicating during a game or other activity.

Multiple individuals can be pointing at roughly the same location or a same object. Multiple users may want to cooperate to select or identify the same object. Multiple users may want to cooperate to select or identify multiple objects. The object or objects may be moving. For example, multiple firefighters can be pointing at a same window or other position on a building. Multiple individuals on a street can be pointing at the same vehicle on the street. For example, several police officers can be pointing at the same car. Multiple individuals in a venue may be pointing at roughly the same location. Multiple people in a city park may be pointing at an object. For example, security personnel may be pointing at the same person, or at an open door, or at an object. Multiple people on a search and rescue mission may identify an object, or a person or an animal to be rescued, or a hazard or obstacle.

The selected geographic location can be used to control communication. For example, an individual can point at another individual and initiate communication directly with that individual. An individual can select a group of individuals, such as by pointing at them individually or selecting them as a group with a gesture, to communicate with the group. An individual can, with a gesture such as pointing to the sky, initiate communication with a predetermined set of individuals. Similarly, communication with, or control of, or both, objects can be performed by pointing at an individual object, selecting a group of objects within a set, or selecting a predetermined set of objects.

The geographic location can be defined as an absolute location or a relative location. Examples of absolute locations include, but are not limited to, coordinates in a map system, geographical positioning system (GPS) coordinates, or longitude and latitude in various resolutions, or any combination of these. Examples of relative locations include, but are not limited to, a reference point and a direction, or a reference point and a direction and a distance, a plurality of reference points and respective directions from those reference points, or a plurality of reference points and respective directions and distances from those reference points, or any combination of these.

The geographic location can be determined based on inputs from sensor data from a sensor associated with at least one person. Additional sensor data from sensors associated from one or more other persons, or one or more other objects, or a combination of these, can be used to determine the geographic location. Examples of such sensors include at least any one or more of the following: a location sensor (as described below) for locating a body part, a geomagnetic sensor, a compass, a magnetometer, an accelerometer, a gyroscope, altimeter, eye tracking device, an encoder providing information indicating a change in position, a camera providing image data or motion video, a reference to a known landmark, or other sensor that can provide an indication of a direction from a person, or any combination of one or more of these. The sensor data can be interpreted as, for example, any of a number of primitive gestures by the person, an intended action, an arm angle or other indication of relative vertical location, a direction or bearing, a distance, or an altitude or any combination of these. The geographic location can be determined based on such sensor data received from sensors associated with one or more persons.

In some implementations, the determination of the geographic location can be assisted using context data. Such context data can include information, such as a geographic location, of one or more objects, voice, sound, or text data, image data from one or more cameras, map data or user inputs with respect to a map, or any combinations of these or yet other context information.

In some implementations, additional information, such as such context data, can be used to provide inputs to select, control, actuate, or perform other actions related to a geographic locations or an object selected based on the geographic location. For example, voice, gesture, or other data can be used as a modifier. For example, a firefighter pointing at a building can communicate through voice, e.g., "two persons are near the second floor window!". For example, voice, gesture, or other data can be used to annotate a selected object, with different gestures being used to provide different labels for the object, such as "safe" or "dangerous". For example, voice, gesture, or other data can be used to activate a command with respect to an object, with different actions being actuated in different ways. Such actuations can be analogous to a "click", but can be obtained from any other data received from a user.

Figure 9A:
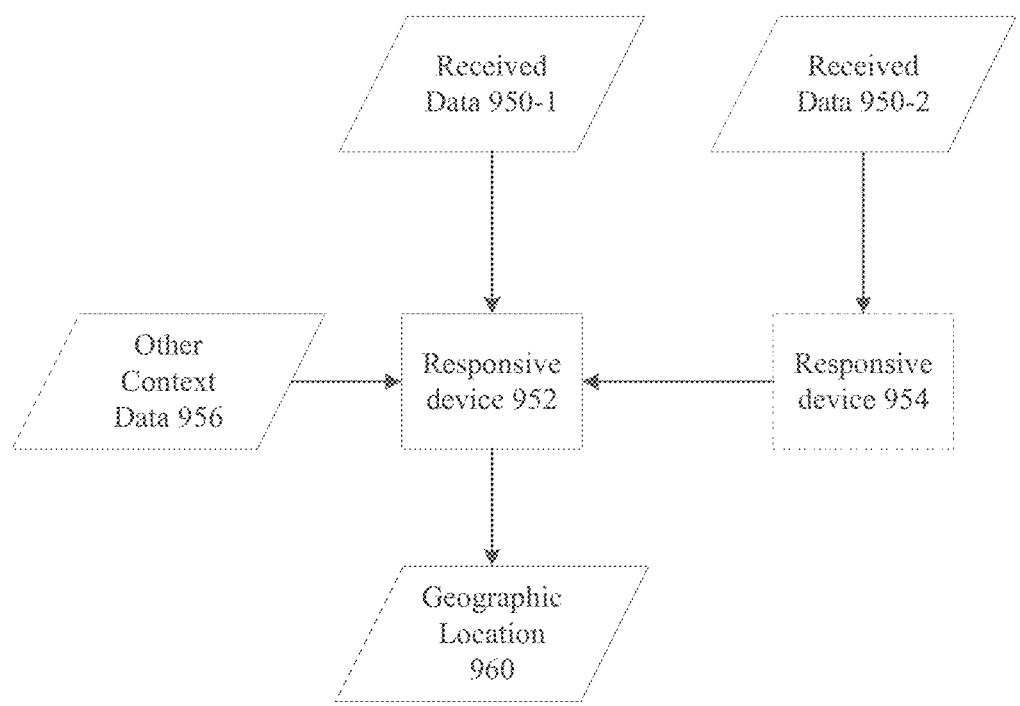
FIG. 9A is a data flow diagram illustrating determining a geographic location.

FIG. 9A is an illustrative data flow diagram of a system that determines geographic location. In FIG. 9A, received data 950-1, 950-2, . . . , hereinafter "950", from one or more user interface devices, is received at a responsive device 952. In some implementations, received data 950-2 from a second user interface device (if available) may be communicated through its own responsive device 954, which in turn provides information to the responsive device 952. In some implementations, responsive device 952 and 954 can provide information to yet another device to determine the geographic location.

To assist in determining geographic locations based on the data received from the user interface devices, the received data 950 includes at least sensor data from one or more sensors on a user interface device. Examples of such sensors include at least any one or more of the following: a location sensor (as described below) for locating a body part, a geomagnetic sensor, a compass, a magnetometer, an accelerometer, a gyroscope, an altimeter, an eye tracking device, encoders providing information indicating a change in position, image data from cameras, a reference to a known landmark, or sound sensor, such as one or more microphones, or other sensor that can provide an indication of a direction from a person, or any combination of two or more of these. In some implementations, the responsive device 952 can use the received data 950 from the user interface device to determine a pose of the hand and motion of the wrist, from which information such as pointing, a pointing direction, pointing with motion can be determined. Other primitive gestures also can be detected to indicate selection of an object or an action to be performed with respect to a selected object.

The responsive device 952 also may receive other context data 956. The other context data 956 can be any one or more of at least the following types of data.

The context data can include information, such as a geographic location, of one or more objects. For example, a database of information about objects can be accessed.

The context data 956 can include voice or other audio data from one or more microphones. The context data 956 can include text or other data derived from speech or other audio signals recognized from such audio data.

The context data 956 can include image data or video data from one or more cameras. The video data can provide depth information provided by time of flight processing. Similarly, other time of flight sensors can provide such depth information. The context data 956 can include results of object recognition or surface detection based on such image data.

The context data 956 can include user input with respect to a map or other information associated with a map. Such user input can include, for example, a location, area, or curve with respect to the map. Point of interest data associated with a map of the area around the user(s) also can be available as context data 956.

Figure 9B:
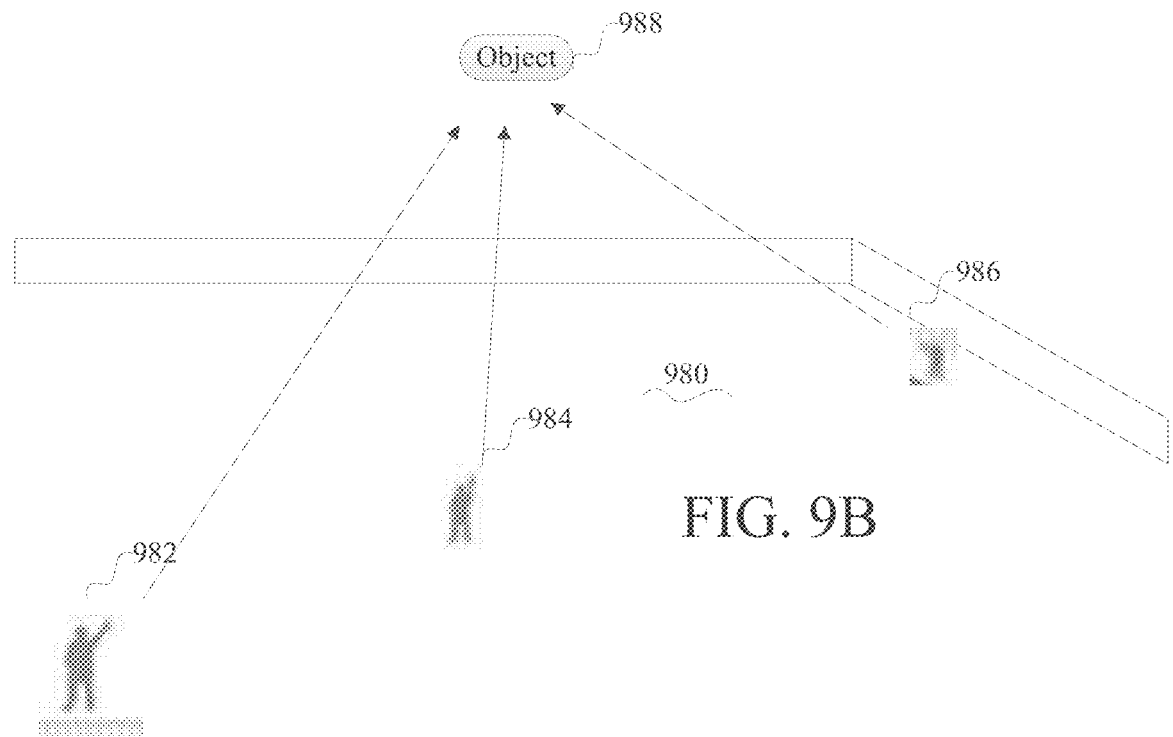
FIGS. 9B and 9C illustrate an example scenario of determining a geographic location/
Figure 9C:
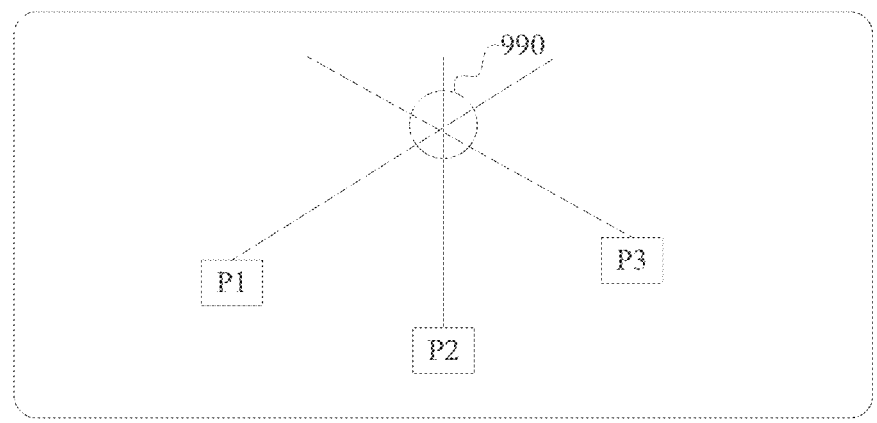

Turning now to FIGS. 9B and 9C, and example use case in which a geographic location can be determined is illustrated. In FIG. 9B, an area 980 is shown in which three persons 982, 984, and 986 are illustrated at different geographic locations within the area 980. The drawing is not to scale, but is intended to show some perspective or depth with the individual each standing on the ground within the area 980. Each person is pointing at an object 988, illustrated above ground. It should be understood that individuals providing such information can be located anywhere, and not necessarily on the ground, as these techniques can apply to people on the ground, in vehicles, under water such as for scuba diving, or in the air, such as in airborne vehicles such as airplanes or even parachuting. Each of the persons is illustrated at pointing at the object 988, thus providing different directions of pointing from their respective locations within the area 980. An angle of an arm of a person also can be provided. From the information available from the individuals, namely, their locations and directions of pointing, and optionally arm angles, a geographic location of the object 988 can be determined. The location in two-dimensions, corresponding to the ground of area 980, can be determined using the locations and pointing directions of the individuals. An elevation of the object can be determined further using the arm angles from the individuals.

In FIG. 9C, an illustration of the geographic location of the object 988 on an example display in two-dimensions is shown. For example, one of the persons can have a device with a display that provides a graphical indication 990 of the determine geographic location of the object 988. The display optionally can include the geographic locations of the person, e.g., P1. The display optionally can include the geographic locations of the other persons, e.g., P2 and P3.

Returning to FIG. 9A, given the received data 950, and any context data 956, the responsive device can determine the geographic location 960. There are many ways in which to compute the geographic location. Several examples follow.

The geographic location can be determined from the sensor data, and optionally context data, using a variety of different kinds of processing techniques. In some implementations, forms of triangulation can be applied using directions from multiple reference points. In some implementations, an input can allow a user to specify a distance in relationship to a determined location and direction. In some implementations, techniques from computational geometry can be applied, such as variants of simultaneous localization and mapping (SLAM) algorithms which compute a location of an agent, where the geographic location to be determined is treated as the location of the agent to be computed. In some implementations, forms of odometry can be used where change in position over time is determined based on sensor data. In some implementations, visual odometry can be performed on images from cameras. Any combination of such implementations also can be used.

The sensor data used to determine a geographic location also can have a time stamp or other indicia of time. In implementations in which sensor data associated with multiple users or devices is used, then the time information can be used to eliminate or weight sensor data. For example, more recent data can be emphasized or used, and less recent data can be deemphasized or discarded.

The determination of the geographic location also can include data indicating a level of certainty, or validation, or confidence, or a range about the determined geographic location. For example, such data can be based on the number of inputs used to determine the geographic location. As an example, if data is obtained from a larger number of sources, such as a larger number of individuals pointing at a same general area, then this data likely it implies increased validation of the object being the intended object or an increasing meaningfulness of the object, or both. As another example, the data can be based on the resolution of the available data used to compute the geographic location.

For example, given a first geographic location and a first direction for a first person, defining a first vector, and a second geographic location and a second direction for a second person, defining a second vector, the intersection of the first and second vectors provides a location. The first and second geographic locations, and first and second directions, can be based on a time of detection of a primitive gesture, such as a finger lift occurring while a person is pointing in a direction, from the respective user interface worn by the person. In response to the primitive gesture, the data available around that time can be used as one or more of the geographic locations or directions. Thus, two individuals can point at an object, and their information can be used to determine a geographic location of that object.

As another example, given a geographic location of a person, a bearing and a distance can be derived from the data received from the user interface device. The bearing can be derived from signals from a geomagnetic sensor or by left and right motion of the wrist or both. The distance can be based on up and down motion of the wrist. A vector to a determined geographic location can be displayed to the user such as on a map on a display or in a heads up display to provide feedback to the user about the determined geographic location. The responsive device can update that location in response to further input from the user.

As another example, given a geographic location of a person, a bearing and a distance can be derived from the data received from the user interface device and from data received from another device carried by the person. For example, the person wearing the user interface device may have a mobile device such as a phone, which has its own geomagnetic sensor or other sensor, or sensors, from which a first direction can be derived. The person wearing the user interface device may have a heads-up display that includes eye tracking. The persons wearing the user interface device may have a second user interface device worn on a different arm from a first user interface device. The first direction can be computed so that it is intended to represent, for example, a gaze direction of the person, or a direction in which the person's head or chest or hand is pointing. The user interface device also provides one or more signals from which a second direction can be derived, such as a bearing based on the geomagnetic sensor, indicating a direction in which a hand is pointing. Vectors representing the first and second directions, projected to a common plane, and differences between origins for the first and second directions, can be used to determine a point of intersection, providing a distance to the geographic location from one or both of the origins. A vector to a determined geographic location can be displayed to the user such as on a map on a display or in a heads up display to provide feedback to the user about the determined geographic location. The responsive device can update that location in response to further input from the user.

As another example, given a geographic location of a person, a direction, and a selected object, time of flight data of the selected object can be used to determine distance information. A vector to a determined geographic location, based on the geographic location of the person, their direction, and the distance to the selected object, can be displayed to the user such as on a map on a display or in a heads up display to provide feedback to the user about the determined geographic location. The responsive device can update that location in response to further input from the user.

In some implementations, context data can be used to refine a computed geographic location. For example, if a user says "bank", then a location corresponding to a "bank" can be selected. As another example, an area selected on a map can be used to ensure the determined geographic location is in that area.

The geographic location in turn can be used in many ways, examples of which include but are not limited to the following and can include combinations of two or more of the following. A geographic location can be used as an input to an application, such as to identify or select an object. Various operations can be performed by an application in connection with a selected object, of which non-limiting examples include invoking tracking of the object by camera, or obtaining information about the object from a database. A geographic location can be data communicated to another user or another machine. A geographic location can be treated as context information when selecting an action to be performed in combination with data based on the signals received from one or more user interface devices. A geographic location can be provided as feedback to a user, such as by displaying a point on a map.

Given a geographic location 960, a variety of operations can be performed with such information in addition to feedback to a user on a display on a map. For example, in some implementations, such point of interest data can be provided as feedback data along with any determined geographic location 960. Such a geographic location 960, along with other information derived from the received data from the user interface device, can be provided to an application for processing. One or more objects near the determined location can be detected or tracked or selected. An operation can be performed in connection with a detected or selected object, such as invoking tracking of the object by camera, or obtaining information about the object from a database.

In one example implementation, consider an application in which the person is viewing objects, possibly in a three-dimensional space. The viewer may be wearing a virtual reality display or other immersive display. The viewer may be viewing a conventional two-dimensional display. The user interface device enables the user to intuitively select and perform actions with respect to displayed objects, even while grasping other objects.

Figure 9D:
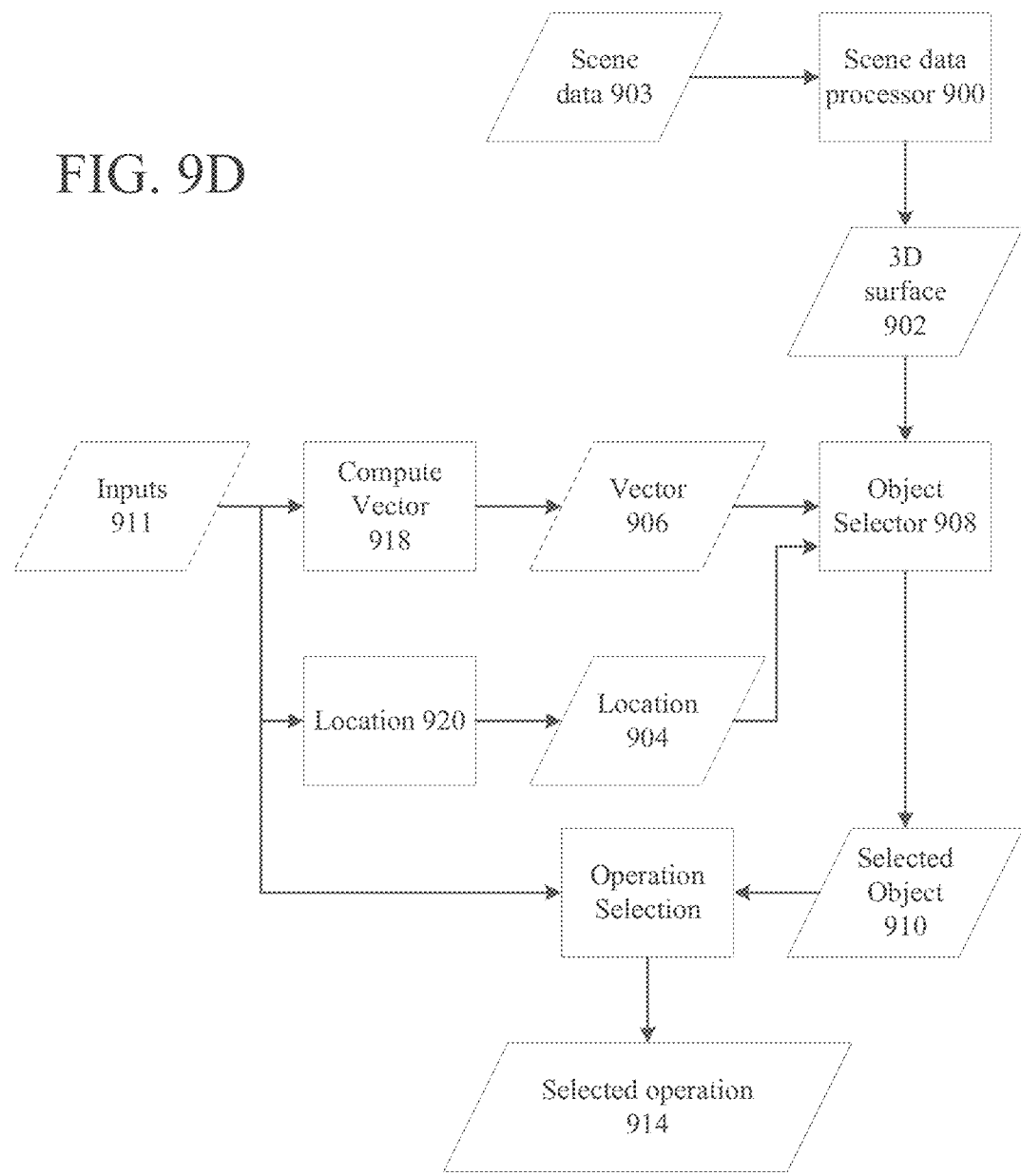
FIG. 9D is a data flow diagram of an application that selects an operation to be performed on an object selected within a three-dimensional scene.

Referring now to FIG. 9D, with a virtual scene being displayed, a computer has a three-dimensional model of the scene which is being rendered, represented by scene data 903. This scene data 903 can be processed, using scene data processor 900, to generate data representing a three-dimensional surface 902. Given a location 904 of the user interface device or user in the scene, and a vector 906 emanating from that location, an intersection of that vector and the 3D surface can be determined. That point of intersection corresponds to an object in the three-dimensional scene. An "object selector" 908 can process the 3D surface, vector, and location information to select an object 910.

The inputs 911 based on the signals from the user interface device can be used to compute the vector 906 using a vector computing module 918. In some applications, the vector can be provided by the application, such as a direction of view of an avatar in a video game. Similarly, the inputs 911 based on the signals from the user interface device can be used to compute the location 904 using a location computing module 920.

Given a selected object 910, and inputs 911 based on signals from the user interface device, an operation 914 can be performed with respect to the selected object. An operation selection module 916 receives the inputs 911 and selected object 910 and determines the selected operation 914 to be performed.

The application can have, for each object, a set of possible inputs and corresponding actions. The inputs received based on the user interface device can be one or more of the possible inputs associated with the selected object. In response to these inputs, the application can select an operation to perform on the selected object.

As another example implementation, consider an application in which the person is viewing real-world objects through a heads-up or augmented reality display. The user interface device enables the user to intuitively select and perform actions with respect to the real-world objects, even while grasping other objects. This selection of a real-world object, and performance of an operation with respect to that selected object, can be implemented in an application in a similar manner as described above in connection with FIG. 9B. However, in this instance, there is no artificial scene data 903 from which the surface of objects is already defined in three dimensions. Instead, a responsive device may be receiving video information representing a real-world location, such as a camera from a headset worn by the user. In this instance, the video information is processed to extract surface information to provide scene data 903.

Figure 10:
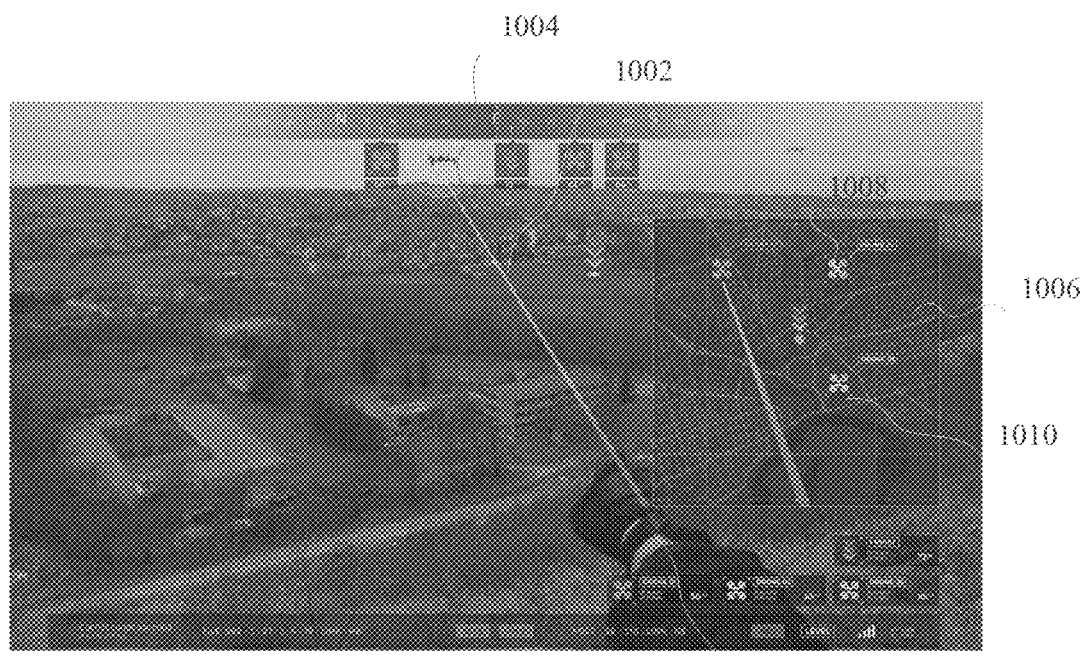
FIG. 10 is an example graphical user interface.

An example user interface is shown in FIG. 10. This interface can be provided, for example, in a heads up display. In this image, the user can see the wrist-worn user interface device 1000, and a line 1002 displayed as emanating from the wrist-worn device to a selected object 1004. An overhead view 1006 in two dimensions can be shown. Other objects that can be selected are indicated at 1008 and 1010. Any one of these objects can be selected based on location of the wrist, and then another primitive gesture, such as an index lift, can designate an operation to be performed on the selected object, such as to retrieve information about that object. In this example, the objection 1004, 1008 and 1010 can be drones or other objects that can then be controlled after being selected using techniques described above.

Figure 11:
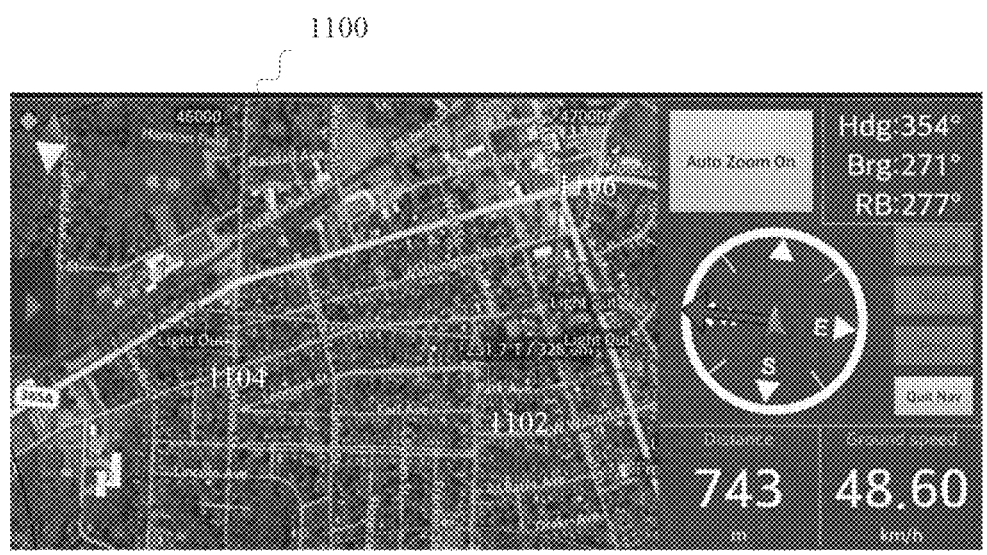
FIG. 11 is an example graphical user interface.

In another example implementation, consider an application in which the person is viewing real-world objects in a two-dimensional, third-person view, such as shown in FIG. 11. For example, a display may present a two-dimensional aerial map 1100, where the user's position, or a position of a selected object, also is noted on the map, such as by arrow 1102. Using an arrow allows for an orientation based on geomagnetic sensing to be reflected in the display. The user's geographic location may be entered by the user, or may be determined using global positioning system (GPS) data, or other data suitable for determining such a geographic location, which may be provided by a mobile phone or other mobile device which the user may have on their person. The GPS or other geographic location information may be provided by the responsive device, such as a tablet computer being used by the user.

In such a user interface, in response to motion of the wrist, such as lifting and lowering the arm, the responsive device can change the distance on the map between the position 1102 along a line to another geographic location 1104 remote from the user. The responsive device can use direction or heading information from a geo-positioning sensor on the user interface device or from another source to change the direction of that line. For example, the user can move the wrist left and right to change the bearing information, and can move the wrist up and down to change the distance.

After manipulating the point on the map by the heading and distance from the position 1102, a primitive gesture can be used to select an object at that point and perform an operation with respect to the selected object, perhaps based on another primitive gesture. For example, a lift can be used to initiate an operation with respect to a selected object.

As another example, in response to a finger swipe, the responsive device can define an arc based on an initial position 1104 at the beginning of the swipe, and an end position 1106 at the end of the swipe, given an initial heading and distance. In response to another primitive gesture, the responsive device can allow selection of one or more objects in the area defined by the points 1102, 1104, and 1106.

In the examples given above, in some applications there can be multiple user interface devices. In some implementations, multiple user interface devices house different parts of the user interface device, such as the biopotential sensor and the location sensor, and may be worn on the same body part. In some implementations, multiple user interface devices are worn on different body parts. For example, a first user interface device can be worn at the top of the wrist of the right arm and a second user interface device can be worn at the top of the wrist of the left arm. When multiple user interface devices are used, they can be generally the same, e.g., having the same form factor, sensors, and feedback devices, but also can be different. For example, a user interface device worn at the top of the wrist may be configured differently from a user interface device worn at the ankle. In implementations using multiple user interface devices, the selection of an application or the selection of an operation to be performed by an application, or both, further can be based on which user interface device is providing the data based on biopotential signals or location signals.

Having now described several examples of interaction of a person with a responsive device through inputs provided by a user interface device, further details of example implementations of signal processing and detection of primitive gestures will now be provided.

To enable various primitive gestures to be detected, conditioned signals from the sensors are further processed to detect patterns in those signals which correspond to the primitive gestures. In some implementations, signals received from the biopotential sensor can be processed to classify a portion of the biopotential signals, occurring at a moment in time, into data indicating a pose of the hand occurred at that moment in time. Signals received from the location sensor can be processed to classify a portion of the location signals at a moment in time into data indicating a location of the top of the wrist at that moment in time. In some implementations signals from both the biopotential sensor and the location sensor are processed together to obtain data indicating poses of the hand and locations of the top of the wrist at moments in time. The data about poses of the hand and locations of the wrist can be processed to allow detection of primitive gestures. In some implementations, features are extracted from the biopotential signals and location signals, and these features can be processed directly into data indicative of primitive gestures.

The signal from a sensor can be in the form of a sequence of digital samples having an amplitude for each sample and a sampling rate. To perform various signal processing operations on the signal, the system defines a sequence of "windows" of samples. A window of samples can be specified by a. a moment in time in the signal, and b. a period of time or a number of samples around that moment in time. For each window, features are calculated using digital signal processing techniques. Any given window, or a collection of windows, can be labeled as representing a primitive gesture or not representing a primitive gesture.

As an example, illustrative implementation, a window can be 200 milliseconds, with adjacent windows overlapping by fifty percent (50%) meaning that the samples forming the last 100 milliseconds of a first window also are the samples forming the first 100 milliseconds of a second window immediately following the first window in a sequence of windows. Different window structures can be used for data collection and labeling than used for real time processing and classification of signals. For example, for real-time classification, a sliding window of 200 milliseconds without overlap can be used. Both the size of the window and the overlap of adjacent windows can be tuned for a particular user interface design and application.

Given windows of samples of a conditioned sensor signal, each window is processed to extract features, which in turn are used for defining and discriminating between different patterns related to the kinds of information desired to be extracted from the sensor signals, such as location or motion of the wrist, or pose of the hand, or other characterization.

A processing module within a responsive device that performs feature extraction or gesture detection can implement a device interface to receive the sampled sensor data from the user interface device, and implements an application interface to provide features or other data to other applications within the responsive device. The features can be output as a stream of data indicating, for each window, features associated with the window.

Features that can be derived from signals include, for example, features obtained from processing a time domain representation of the signal, and features obtained from processing a frequency domain representation of the signal. Features that can be obtained from the time domain representation of the signal include, but are not limited to, the Hudgin's time domain features.

Examples features that can be computed for each window are listed in Tables I-V. Not all of the listed features are required; and there may be some features not listed that also can be used:

TABLE I

| Base feature set for a single channel |
|---|
| Mean absolute value |
| Number of zero crossings |
| Number of slope sign changes |
| Waveform length |
| Willison amplitude |

TABLE II

Expanded feature set for single channel (addition to Table I)

Root mean squared
Variance
Log detector
Myoelectric pulse rate
Mean square root
Energy
Sample entropy
Mean frequency
Maximum frequency
Median frequency
Variance of amplitudes
Modified mean frequency
Modified median frequency
First spectral moment
Frequency ratio
Mean absolute value slope
First autoregressive coefficient

TABLE II

Example features derived from comparing two channels:

Energy ratio
Energy difference

TABLE III

Features extracted from IMU channels:

Mean of gyroscope value
Mean of accelerometer value
Standard deviation of gyroscope value
Standard deviation of accelerometer value

TABLE IV

Feature combinations involving the signals from all gyroscope channels or from all accelerometer channels:

Mean velocity
Maximum velocity
Minimum velocity
Mean acceleration
Maximum acceleration
Minimum acceleration With enough data, the signal itself can be fed into deep learning models which will learn their own features.

Model Training

One technique for processing signals to detect patterns is to use a parameterized model for which the parameters are trained based on signals corresponding to patterns which are known. Such signals are "labeled", meaning there is data associated with the signal indicating the pattern which the signal is known to contain. A computer system processes labeled data to generate a model through a process called "training". The resulting model can detect, in a real-time signal from a sensor, whether a particular pattern occurred in the real-time signal from the sensor.

One of the challenges with training such models is acquiring a substantial amount of labeled data, called a training set. The training set ideally includes positively and negatively labeled samples. A positively labeled sample is a sample that is labeled as representative of a known characterization of the signal. A negatively labeled sample is a sample that is known not to include a known characterization of the signal. Having such negatively labeled samples in a training set allows a model to be trained which can better distinguish intentional activity from everyday activity of the person.

There are several ways to obtain positively-labeled samples for a training set. In one implementation, a plurality of user interface devices can be equipped to receive signals from a computer. In response to those signals, the user interface device generates a prompt to the person wearing the user interface device to perform a specified action. The user then performs the specified action. The user interface device sends the sensor signals to the computer, which labels the signal according to the specified action.

More specifically, each window of samples in the received signal is labeled according to the selected motion. Given a set of samples comprising several windows, a window is labeled as corresponding to, or not corresponding to a pose of the hand or a wrist location or primitive gesture or any combination of these. Given a set of samples and a label, a window labeling component identifies an onset. Windows of samples occurring prior to a window with an onset are not labeled. The set of samples in windows that are not labeled prior to the detected onset can be discarded for the purpose of training.

Another example method of gathering training data is to use an application running in a computing device with a touchscreen or other device that can detect actual hand and finger position.

Model training typically is specific to a specific version of sensors and signal processing performed on signals from those sensors. Multiple users with devices of the same configuration (i.e., same sensors, sensor configuration, low level signal processing, and feature extraction hardware), can provide data for training a model for that configuration. However, given a number of labeled windows of data including their corresponding features, and optionally additional sensor data corresponding to those windows, conventional training algorithms can be applied to models that have been adapted to accommodate the specific kinds of signals being processed.

Training can be performed to create a trained model for a single user using labeled data from a single user, or to create a trained model for multiple users using labeled data from multiple users. Training of a model for a single user can be performed on a computing device accessible to the user interface device of that single user. For multiple users, labeled data can be transferred to and stored with a server computer connected over a computer network to a source of each user's labeled data.

After training and testing a model, the trained model can be deployed. A user's device, whether a responsive device or user interface device, downloads the trained model from a server computer or from the computing device that trained the model.

Some features can emerge from training such models as having an impact on classification. For example, it has been discovered that the energy ratio between first and second channels of the first sensor is very predictive for separating thumb and index extension. In some cases, this ratio can also be used to filter out other "false positives" such as wrist extension, pinky extension, etc. There is a dependence between sensor configuration and signal quality, on the one hand, and the ability to distinguish between certain poses, locations, primitive gestures, or combinations of these, such as between thumb and index extension in terms of energy ratio.

Figure 12:
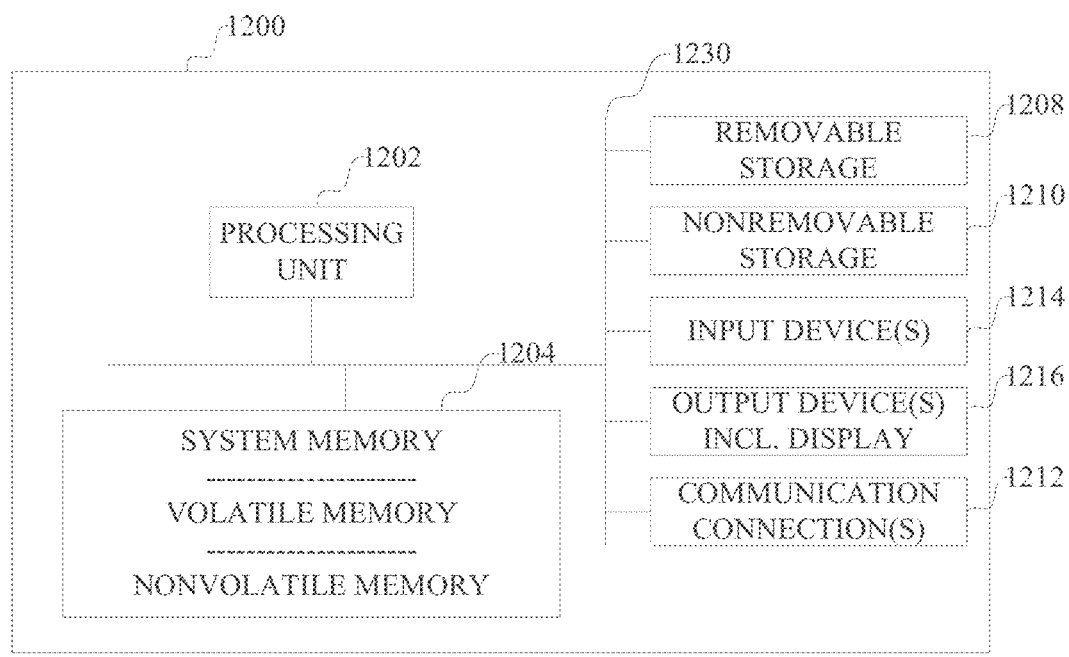
FIG. 12 is a block diagram of a general-purpose computer.

Having now described several example implementations, FIG. 12 illustrates an example of a general purpose computing device with which can be used to implement a responsive device or other computer systems used in connection with such responsive devices. This is only one example of a computer and is not intended to suggest any limitation as to the scope of use or functionality of such a computer. The system described above can be implemented in one or more computer programs executed on one or more such computers as shown in FIG. 12.

FIG. 12 is a block diagram of a general-purpose computer which processes computer program code using a processing system. Computer programs on a general-purpose computer typically include an operating system and applications. The operating system is a computer program running on the computer that manages access to various resources of the computer by the applications and the operating system. The various resources typically include memory, storage, communication interfaces, input devices and output devices.

Examples of such general-purpose computers include, but are not limited to, larger computer systems such as server computers, database computers, desktop computers, laptop and notebook computers, as well as mobile or handheld computing devices, such as a tablet computer, hand held computer, smart phone, media player, personal data assistant, audio or video recorder, or wearable computing device.

With reference to FIG. 12, an example computer 1200 comprises a processing system including at least one processing unit 1202 and a memory 1204. The computer can have multiple processing units 1202 and multiple devices implementing the memory 1204. A processing unit 1202 can include one or more processing cores (not shown) that operate independently of each other. Additional co-processing units, such as graphics processing unit 1220, also can be present in the computer. The memory 1204 may include volatile devices (such as dynamic random access memory (DRAM) or other random access memory device), and non-volatile devices (such as a read-only memory, flash memory, and the like) or some combination of the two, and optionally including any memory available in a processing device. Other memory such as dedicated memory or registers also can reside in a processing unit. This configuration of memory is illustrated in FIG. 12 by dashed line 1204. The computer 1200 may include additional storage (removable or non-removable) including, but not limited to, magnetically-recorded or optically-recorded disks or tape. Such additional storage is illustrated in FIG. 12 by removable storage 1208 and non-removable storage 1210. The various components in FIG. 12 typically are interconnected by an interconnection mechanism, such as one or more buses 1230.

A computer storage medium is any medium in which data can be stored in and retrieved from addressable physical storage locations by the computer. Computer storage media includes volatile and nonvolatile memory devices, and removable and non-removable storage devices. Memory 1204, removable storage 1208 and non-removable storage 1210 are all examples of computer storage media. Some examples of computer storage media are RAM, ROM, EEPROM, flash memory or other memory technology, CD-ROM, digital versatile disks (DVD) or other optically or magneto-optically recorded storage device, magnetic cassettes, magnetic tape, magnetic disk storage or other magnetic storage devices. Computer storage media and communication media are mutually exclusive categories of media.

The computer 1200 may also include communications connection(s) 1212 that allow the computer to communicate with other devices over a communication medium. Communication media typically transmit computer program code, data structures, program modules or other data over a wired or wireless substance by propagating a modulated data signal such as a carrier wave or other transport mechanism over the substance. The term "modulated data signal" means a signal that has one or more of its characteristics set or changed in such a manner as to encode information in the signal, thereby changing the configuration or state of the receiving device of the signal. By way of example, and not limitation, communication media includes wired media such as a wired network or direct-wired connection, and wireless media include any non-wired communication media that allows propagation of signals, such as acoustic, electromagnetic, electrical, optical, infrared, radio frequency and other signals. Communications connections 1212 are devices, such as a network interface or radio transmitter, that interface with the communication media to transmit data over and receive data from signals propagated through communication media.

The communications connections can include one or more radio transmitters for telephonic communications over cellular telephone networks, or a wireless communication interface for wireless connection to a computer network. For example, a cellular connection, a Wi-Fi connection, a Bluetooth connection, and other connections may be present in the computer. Such connections support communication with other devices, such as to support voice or data communications.

The computer 1200 may have various input device(s) 1214 such as various pointer (whether single pointer or multi-pointer) devices, such as a mouse, tablet and pen, touchpad and other touch-based input devices, stylus, image input devices, such as still and motion cameras, audio input devices, such as a microphone. The compute may have various output device(s) 1216 such as a display, speakers, printers, and so on, also may be included. These devices are well known in the art and need not be discussed at length here.

The various storage 1210, communication connections 1212, output devices 1216 and input devices 1214 can be integrated within a housing of the computer, or can be connected through various input/output interface devices on the computer, in which case the reference numbers 1210, 1212, 1214 and 1216 can indicate either the interface for connection to a device or the device itself as the case may be.

An operating system of the computer typically includes computer programs, commonly called drivers, which manage access to the various storage 1210, communication connections 1212, output devices 1216 and input devices 1214. Such access can include managing inputs from and outputs to these devices. In the case of communication connections, the operating system also may include one or more computer programs for implementing communication protocols used to communicate information between computers and devices through the communication connections 1212.

Each component (which also may be called a "module" or "engine" or the like), of a computer system and which operates on one or more computers, can be implemented as computer program code processed by the processing system(s) of one or more computers. Computer program code includes computer-executable instructions or computer-interpreted instructions, such as program modules, which instructions are processed by a processing system of a computer. Such instructions define routines, programs, objects, components, data structures, and so on, that, when processed by a processing system, instruct the processing system to perform operations on data or configure the processor or computer to implement various components or data structures in computer storage. A data structure is defined in a computer program and specifies how data is organized in computer storage, such as in a memory device or a storage device, so that the data can accessed, manipulated and stored by a processing system of a computer.

It should be understood that the subject matter defined in the appended claims is not necessarily limited to the specific implementations described above. The specific implementations described above are disclosed as examples only.

What is claimed is:

1. A system for selecting a target, the system comprising:
a wearable device configured to be worn on a person's wrist and comprising one or more sensors, the wearable device being configured to detect at least:
physiological data, the physiological data being configured to indicate a state of a person's hand;
wrist location data, the wrist location data being indicative of a location of the person's wrist;
wherein the system is configured to:
based on at least the wrist location data, determine a directional vector intended by the person;
based on at least the physiological data, detect a gesture indicating an intention to make a selection; and
based on the directional vector and the detected gesture, select a target, the selected target being indicated by the directional vector as determined when the gesture indicating the intention to make a selection is detected.

2. The system of claim 1, wherein the one or more sensors comprises a biopotential sensor, and the physiological data comprises biopotential data collected by the biopotential sensor.

3. The system of claim 1, wherein the target is a geographic location.

4. The system of claim 1, wherein the target is an object.

5. The system of claim 4, wherein the system is further configured to:
after selecting the object based on the directional vector and the detected gesture, control the object;
wherein the step of controlling the object comprises:
based on at least the wrist location data and the physiological data, determining one or more commands; and
transmitting the one or more commands to the object.

6. The system of claim 5, wherein the system is further configured to initiate a mode in which the step of controlling the object may be performed;
wherein initiating the mode in which the step of controlling the object may be performed comprises:
based on one or more of (i) the wrist location data and (ii) the physiological data, detecting a wake word gesture, the wake word gesturing indicating an intention to initiate the mode in which the step of controlling the object may be performed.

7. The system of claim 1, wherein the step of determining the directional vector intended by the person is performed based on both:
the wrist location data; and
data indicating a location of the person.

8. The system of claim 7, wherein the data indicating the location of the person is global positioning system (GPS) data.

9. The system of claim 7, wherein the data indicating the location of the person is based on triangulation using directions from multiple reference points.

10. The system of claim 7, wherein the step of selecting the target is based on at least:
the directional vector based on (i) the wrist location data and (ii) the data indicating a location of the person;
the detected gesture based on at least the physiological data; and
context data comprising information related to the target.

11. The system of claim 10, wherein the context data comprises a location of the target.

12. The system of claim 10, wherein the context data comprises image data or video data.

13. A system for selecting a target, the system comprising:
a wearable device configured to be worn on a person's wrist and comprising one or more sensors, the wearable device being configured to detect at least:
physiological data, the physiological data being configured to indicate a state of a person's hand;
wrist location data, the wrist location data being indicative of a location of the person's wrist;
wherein the system is configured to provide output data based on the physiological data and the wrist location data to one or more processors configured to:
based on at least the wrist location data, determine a directional vector intended by the person;
based on at least the physiological data, detect a gesture indicating an intention to make a selection; and
based on the directional vector and the detected gesture, select a target, the selected target being indicated by the directional vector as determined when the gesture indicating the intention to make a selection is detected.

14. The system of claim 13, wherein the one or more sensors comprises a biopotential sensor, and the physiological data comprises biopotential data collected by the biopotential sensor.

15. The system of claim 13, wherein the target is a geographic location.

16. The system of claim 13, wherein the target is an object.

17. The system of claim 16, wherein the one or more processors are further configured to:
after selecting the object based on the directional vector and the detected gesture, control the object;
wherein the step of controlling the object comprises:
based on at least the wrist location data and the physiological data, determining one or more commands; and
transmitting the one or more commands to the object.

18. The system of claim 17, wherein the one or more processors are further configured to:
initiate a mode in which the step of controlling the object may be performed;
wherein initiating the mode in which the step of controlling the object may be performed comprises:
based on one or more of (i) the wrist location data and (ii) the physiological data, detecting a wake word gesture, the wake word gesturing indicating an intention to initiate the mode in which the step of controlling the object may be performed.

19. The system of claim 13, wherein the step of determining the directional vector intended by the person is performed based on both:
the wrist location data; and
data indicating a location of the person.

20. The system of claim 19, wherein the data indicating the location of the person is global positioning system (GPS) data.

21. The system of claim 19, wherein the data indicating the location of the person is based on triangulation using directions from multiple reference points.

22. The system of claim 19, wherein the step of selecting the target is based on at least:
- the directional vector based on (i) the wrist location data and (ii) the data indicating a location of the person;
- the detected gesture based on at least the physiological data; and
- context data comprising information related to the target.

23. The system of claim 22, wherein the context data comprises a location of the target.

24. The system of claim 22, wherein the context data comprises image data or video data.

25. A method for selecting a target, the method comprising:
- obtaining physiological data, the physiological data being configured to indicate a state of a person's hand;
- obtaining wrist location data, the wrist location data being indicative of a location of the person's wrist;
- based on at least the wrist location data, determining a directional vector intended by the person;
- based on at least the physiological data, detecting a gesture indicating an intention to make a selection; and
- based on the directional vector and the detected gesture, selecting a target, the selected target being indicated by the directional vector as determined when the gesture indicating the intention to make a selection is detected.

26. The method of claim 25, wherein the target is an object, and the method further comprises:
- after selecting the object based on the directional vector and the detected gesture, controlling the object;
- wherein the step of controlling the object comprises:
  - based on at least one of the wrist location data and the physiological data, determining one or more commands; and
  - transmitting the one or more commands to the object.

27. The method of claim 26, further comprising:
- initiating a mode in which the step of controlling the object may be performed;
- wherein initiating the mode in which the step of controlling the object may be performed comprises:
  - based on one or more of (i) the wrist location data and (ii) the physiological data, detecting a wake word gesture, the wake word gesturing indicating an intention to initiate the mode in which the step of controlling the object may be performed.

28. The method of claim 26, wherein the step of determining the directional vector intended by the person is performed based on both:
- the wrist location data; and
- data indicating a location of the person.

29. The method of claim 28, wherein the step of selecting the target is based on at least:
- the directional vector based on (i) the wrist location data and (ii) the data indicating a location of the person;
- the detected gesture based on at least the physiological data; and
- context data comprising a location of the target.

30. The method of claim 28, wherein the physiological data comprises biopotential data collected by a biopotential sensor located on the person's wrist.

* * * * *